(12) United States Patent
Raghavan et al.

(10) Patent No.: US 6,679,803 B1
(45) Date of Patent: Jan. 20, 2004

(54) FAMILY OF MULTI-SPEED POWER TRANSMISSION MECHANISMS HAVING THREE INTERCONNECTED PLANETARY GEARSETS

(75) Inventors: Madhusudan Raghavan, West Bloomfield, MI (US); Chi-Kuan Kao, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/214,039

(22) Filed: Aug. 6, 2002

(51) Int. Cl.[7] .................................................. F16H 3/62
(52) U.S. Cl. ...................................................... 475/276
(58) Field of Search ........................................... 475/276

(56) References Cited

U.S. PATENT DOCUMENTS

| | | | |
|---|---|---|---|
| 4,070,927 A | 1/1978 | Polak | 74/765 |
| 5,106,352 A | 4/1992 | Lepelletier | 475/280 |
| 5,599,251 A | 2/1997 | Beim et al. | 475/275 |
| 6,071,208 A | 6/2000 | Koivunen | 475/275 |
| 6,083,135 A | 7/2000 | Baldwin et al. | 475/276 |
| 6,514,170 B1 * | 2/2003 | Kao et al. | 475/296 |
| 6,595,892 B2 * | 7/2003 | Raghavan et al. | 475/296 |
| 2002/0119859 A1 * | 8/2002 | Raghavan et al. | 475/317 |
| 2003/0054917 A1 * | 3/2003 | Raghavan et al. | 475/330 |
| 2003/0060322 A1 * | 3/2003 | Raghavan et al. | 475/296 |
| 2003/0060323 A1 * | 3/2003 | Kao et al. | 475/296 |
| 2003/0087719 A1 * | 5/2003 | Usoro et al. | 475/276 |
| 2003/0119623 A1 * | 6/2003 | Stevenson et al. | 475/275 |

* cited by examiner

*Primary Examiner*—Dirk Wright
(74) *Attorney, Agent, or Firm*—Kathryn A. Marra

(57) ABSTRACT

A family of power transmissions which are utilized in a powertrain include three planetary gearsets and five torque-transmitting mechanisms. The torque-transmitting mechanisms are engaged in combinations of two to provide a reverse drive ratio and six forward speed ratios. The torque-transmitting mechanisms include at least three rotating type torque-transmitting mechanisms and, two stationary type torque transmitting mechanisms in some family members, four rotary type torque transmitting mechanisms and one stationary type torque-transmitting mechanism in other family members, and five rotary type torque transmitting mechanisms in still other family members. The planetary gearsets are of either the single pinion type or of the double pinion type of planetary gearsets.

14 Claims, 12 Drawing Sheets

| | Ratios | 56 | 58 | 50 | 52 | 54 |
|---|---|---|---|---|---|---|
| Reverse | -4.69 | | X | X | | |
| Neutral | 0 | | X | | | |
| 1 | 4.8 | | X | | | X |
| 2 | 2.33 | X | | | | X |
| 3 | 1.53 | | | X | | X |
| 4 | 1 | | | | X | X |
| 5 | 0.75 | | | X | X | |
| 6 | 0.65 | X | | | X | |

(X=engaged clutch)

$\dfrac{RING\ GEAR}{SUN\ GEAR}$ =TOOTH RATIO: $\dfrac{R_1}{S_1}=1.54$, $\dfrac{R_2}{S_2}=2.60$, $\dfrac{R_3}{S_3}=1.85$

| Ratio Spread | 7.4 |
|---|---|
| Ratio Steps | |
| Rev/1 | -0.98 |
| 1/2 | 2.06 |
| 2/3 | 1.53 |
| 3/4 | 1.53 |
| 4/5 | 1.33 |
| 5/6 | 1.16 |

| | Ratios | 156 | 158 | 150 | 152 | 154 |
|---|---|---|---|---|---|---|
| Reverse | -4.69 | | X | X | | |
| Neutral | 0 | | X | | | |
| 1 | 4.8 | | X | | | X |
| 2 | 2.33 | X | | | | X |
| 3 | 1.53 | | | X | | X |
| 4 | 1 | | | | X | X |
| 5 | 0.75 | | | X | X | |
| 6 | 0.65 | X | | | X | |

(X=engaged clutch)

$\frac{RING\ GEAR}{SUN\ GEAR}$ =TOOTH RATIO: $\frac{R_1}{S_1}=1.54,\ \frac{R_2}{S_2}=2.60,\ \frac{R_3}{S_3}=1.85$

| Ratio Spread | 7.4 |
|---|---|
| Ratio Steps | |
| Rev/1 | -0.98 |
| 1/2 | 2.06 |
| 2/3 | 1.53 |
| 3/4 | 1.53 |
| 4/5 | 1.33 |
| 5/6 | 1.16 |

| | Ratios | 256 | 258 | 250 | 252 | 254 |
|---|---|---|---|---|---|---|
| Reverse | -3.51 | | X | X | | |
| Neutral | 0 | | X | | | |
| 1 | 3.83 | | X | | | X |
| 2 | 2.06 | X | | | | X |
| 3 | 1.37 | | | X | | X |
| 4 | 1 | | | | X | X |
| 5 | 0.76 | | | X | X | |
| 6 | 0.63 | X | | | X | |

(X=engaged clutch)

$$\frac{RING\ GEAR}{SUN\ GEAR} = TOOTH\ RATIO: \quad \frac{R_1}{S_1}=2.99,\ \frac{R_2}{S_2}=2.30,\ \frac{R_3}{S_3}=1.67$$

| Ratio Spread | 6.13 |
|---|---|
| Ratio Steps | |
| Rev/1 | -0.92 |
| 1/2 | 1.86 |
| 2/3 | 1.5 |
| 3/4 | 1.37 |
| 4/5 | 1.31 |
| 5/6 | 1.22 |

| | Ratios | 356 | 358 | 350 | 352 | 354 |
|---|---|---|---|---|---|---|
| Reverse | -3.74 | | X | X | | |
| Neutral | 0 | | X | | | |
| 1 | 3.84 | | X | | | X |
| 2 | 2.01 | X | | | | X |
| 3 | 1.34 | | | X | | X |
| 4 | 1 | | | | X | X |
| 5 | 0.78 | | | X | X | |
| 6 | 0.65 | X | | | X | |

(X=engaged clutch)

$\dfrac{\text{RING GEAR}}{\text{SUN GEAR}}$ = TOOTH RATIO: $\dfrac{R_1}{S_1}=2.99,\ \dfrac{R_2}{S_2}=1.83,\ \dfrac{R_3}{S_3}=2.10$

| Ratio Spread | 5.95 |
|---|---|
| Ratio Steps | |
| Rev/1 | -0.97 |
| 1/2 | 1.92 |
| 2/3 | 1.49 |
| 3/4 | 1.34 |
| 4/5 | 1.28 |
| 5/6 | 1.21 |

| | Ratios | 458 | 450 | 452 | 454 | 456 |
|---|---|---|---|---|---|---|
| Reverse | -3.29 | | X | | X | |
| Neutral | 0 | | X | | | |
| 1 | 3.31 | | X | | | X |
| 2 | 1.73 | | X | X | | |
| 3 | 1 | | | X | | X |
| 4 | 0.69 | X | | X | | |
| 5 | 0.57 | X | | | | X |
| 6 | 0.42 | X | | | X | |

(X=engaged clutch)

$\dfrac{\text{RING GEAR}}{\text{SUN GEAR}}$ = TOOTH RATIO: $\dfrac{R_1}{S_1} = 2.34$, $\dfrac{R_2}{S_2} = 2.20$, $\dfrac{R_3}{S_3} = 1.53$

| Ratio Spread | 7.96 |
|---|---|
| Ratio Steps | |
| Rev/1 | -1 |
| 1/2 | 1.91 |
| 2/3 | 1.73 |
| 3/4 | 1.46 |
| 4/5 | 1.2 |
| 5/6 | 1.37 |

| | Ratios | 558 | 550 | 552 | 554 | 556 |
|---|---|---|---|---|---|---|
| Reverse | -4.23 | X | | X | | |
| Neutral | 0 | X | | | | |
| 1 | 4.34 | X | | | | X |
| 2 | 2.25 | | X | | | X |
| 3 | 1.51 | | | X | | X |
| 4 | 1 | | | | X | X |
| 5 | 0.73 | | | X | X | |
| 6 | 0.63 | | X | | X | |

(X=engaged clutch)

$\frac{RING\ GEAR}{SUN\ GEAR}$ =TOOTH RATIO: $\frac{R_1}{S_1}=1.54,\ \frac{R_2}{S_2}=2.60,\ \frac{R_3}{S_3}=1.67$

| Ratio Spread | 6.93 |
|---|---|
| Ratio Steps | |
| Rev/1 | -0.98 |
| 1/2 | 1.93 |
| 2/3 | 1.49 |
| 3/4 | 1.51 |
| 4/5 | 1.36 |
| 5/6 | 1.17 |

| | Ratios | 658 | 650 | 652 | 654 | 656 |
|---|---|---|---|---|---|---|
| Reverse | -1.7 | X | | | | X |
| Neutral | 0 | X | | | | |
| 1 | 2.6 | X | | | X | |
| 2 | 1.66 | | X | | X | |
| 3 | 1 | | | | X | X |
| 4 | 0.75 | | | X | X | |
| 5 | 0.54 | | | X | | X |
| 6 | 0.42 | | X | X | | |

(X=engaged clutch)

$\dfrac{\text{RING GEAR}}{\text{SUN GEAR}}$ = TOOTH RATIO: $\dfrac{R_1}{S_1} = 1.86$, $\dfrac{R_2}{S_2} = 1.53$, $\dfrac{R_3}{S_3} = 1.60$

| Ratio Spread | 6.15 |
|---|---|
| Ratio Steps | |
| Rev/1 | -0.65 |
| 1/2 | 1.67 |
| 2/3 | 1.56 |
| 3/4 | 1.33 |
| 4/5 | 1.39 |
| 5/6 | 1.27 |

| | Ratios | 758 | 750 | 752 | 754 | 756 |
|---|---|---|---|---|---|---|
| Reverse | -4.1 | X | | | X | |
| Neutral | 0 | X | | | | |
| 1 | 5.97 | X | | | | X |
| 2 | 4 | X | X | | | |
| 3 | 2.72 | | X | | | X |
| 4 | 1.76 | | X | | X | |
| 5 | 1.35 | | | X | X | |
| 6 | 1 | | | | X | X |

(X=engaged clutch)

$\frac{RING\ GEAR}{SUN\ GEAR}$ =TOOTH RATIO: $\frac{R_1}{S_1}=1.87,\ \frac{R_2}{S_2}=1.52,\ \frac{R_3}{S_3}=3.00$

| Ratio Spread | 5.97 |
|---|---|
| Ratio Steps | |
| Rev/1 | -0.69 |
| 1/2 | 1.49 |
| 2/3 | 1.47 |
| 3/4 | 1.55 |
| 4/5 | 1.3 |
| 5/6 | 1.35 |

| | Ratios | 858 | 850 | 852 | 854 | 856 |
|---|---|---|---|---|---|---|
| Reverse | -3.74 | X | | X | | |
| Neutral | 0 | X | | | | |
| 1 | 3.84 | X | | | | X |
| 2 | 2.01 | | X | | | X |
| 3 | 1.34 | | | X | | X |
| 4 | 1 | | | | X | X |
| 5 | 0.78 | | | X | X | |
| 6 | 0.65 | | X | | X | |

(X=engaged clutch)

$\dfrac{\text{RING GEAR}}{\text{SUN GEAR}}$ =TOOTH RATIO:  $\dfrac{R_1}{S_1} = 2.99$,  $\dfrac{R_2}{S_2} = 1.83$,  $\dfrac{R_3}{S_3} = 2.10$

| Ratio Spread | 5.95 |
|---|---|
| Ratio Steps | |
| Rev/1 | -0.97 |
| 1/2 | 1.92 |
| 2/3 | 1.49 |
| 3/4 | 1.34 |
| 4/5 | 1.28 |
| 5/6 | 1.21 |

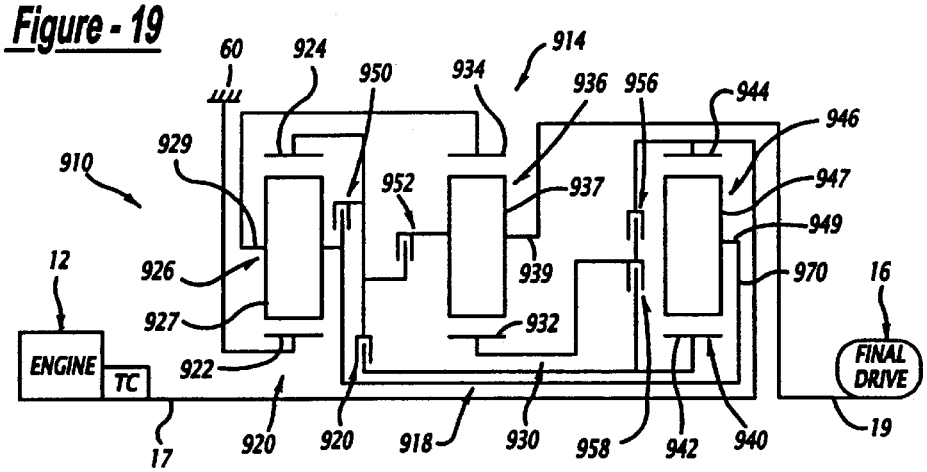

| | Ratios | 1056 | 1058 | 1050 | 1052 | 1054 |
|---|---|---|---|---|---|---|
| Reverse | -4.69 | | X | X | | |
| Neutral | 0 | | X | | | |
| 1 | 4.8 | | X | | | X |
| 2 | 2.33 | X | | | | X |
| 3 | 1.53 | | | X | | X |
| 4 | 1 | | | | X | X |
| 5 | 0.75 | | | X | X | |
| 6 | 0.65 | X | | | X | |

(X=engaged clutch)

$\dfrac{\text{RING GEAR}}{\text{SUN GEAR}}$ = TOOTH RATIO:  $\dfrac{R_1}{S_1} = 2.54$,  $\dfrac{R_2}{S_2} = 2.60$,  $\dfrac{R_3}{S_3} = 1.85$

| Ratio Spread | 7.4 |
|---|---|
| Ratio Steps | |
| Rev/1 | -0.98 |
| 1/2 | 2.06 |
| 2/3 | 1.53 |
| 3/4 | 1.53 |
| 4/5 | 1.33 |
| 5/6 | 1.16 |

| | Ratios | 1150 | 1152 | 1154 | 1156 | 1158 |
|---|---|---|---|---|---|---|
| Reverse | -2.04 | | | X | | X |
| Neutral | 0 | | | X | | |
| 1 | 3.85 | X | | X | | |
| 2 | 2.71 | X | | | | X |
| 3 | 1.58 | X | | | X | |
| 4 | 1 | | | | X | X |
| 5 | 0.8 | | X | | X | |
| 6 | 0.72 | | | | X | X |

(X=engaged clutch)

$\frac{RING\ GEAR}{SUN\ GEAR}$ =TOOTH RATIO: $\frac{R_1}{S_1}=2.37$, $\frac{R_2}{S_2}=1.4$, $\frac{R_3}{S_3}=2.53$

| Ratio Spread | 5.32 |
|---|---|
| Ratio Steps | |
| Rev/1 | -0.53 |
| 1/2 | 1.42 |
| 2/3 | 1.71 |
| 3/4 | 1.58 |
| 4/5 | 1.25 |
| 5/6 | 1.11 |

FAMILY OF MULTI-SPEED POWER TRANSMISSION MECHANISMS HAVING THREE INTERCONNECTED PLANETARY GEARSETS

TECHNICAL FIELD

The present invention relates to power transmissions and, more particularly, to a family of power transmissions having three interconnected planetary gearsets that are selectively controlled by the engagement of five torque-transmitting mechanisms to provide at least six forward speed ratios and one reverse speed ratio.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier employs three planetary gearsets, three clutches and two brakes to provide six forward speed ratios and one reverse ratio. One of the planetary gearsets in Lepelletier is positioned and operated to establish two fixed speed input members for the remaining two planetary gearsets.

SUMMARY OF THE INVENTION

It is an object of the present invention to provide an improved family of multi-speed transmissions having three planetary gearsets and five torque-transmitting mechanisms for providing at least six forward speed ratios.

In one aspect of the present invention, the three planetary gearsets each have three members that are comprised of a sun gear member, a ring gear member, and a planet carrier member. In another aspect of the present invention, an input shaft is continuously connected with one member of one of the planetary gearsets. In yet another aspect of the present invention, an output shaft is continuously connected with another member of one of the planetary gearsets. In still another aspect of the present invention, a member of each of the three planetary gearsets is interconnected.

In yet still another aspect of the present invention, a member of one of the planetary gearsets is continuously connected with a housing member. In yet another aspect of the present invention, two of the torque-transmitting mechanisms are stationary type torque-transmitting mechanisms and three of the torque-transmitting mechanisms are rotary type torque-transmitting mechanisms. In still a further aspect of the present invention, all five of the torque-transmitting mechanisms are rotating type torque-transmitting mechanisms.

In yet still a further aspect of the present invention, a first of the rotary torque-transmitting mechanisms selectively connects a member of the first planetary gearset with either the input shaft, the output shaft, the interconnection between the planetary gearsets, or a member of the second or third planetary gearset. In a still further aspect of the present of the present invention, a second of the rotating type torque-transmitting mechanisms selectively connects a member of a second of the planetary gearsets with the input shaft, or the output shaft, or the fixed interconnection, or a member of the first or third planetary gearsets.

In yet another aspect of the present invention, a third of the rotating torque-transmitting mechanisms selectively connects a member of the third planetary gearset with the input shaft, or the output shaft, or the interconnection between said planetary gear members, or a member of the first or second planetary gearset. In yet still another aspect of the present invention, the fourth of the torque-transmitting mechanisms selectively connects a member of one of the planetary gearsets with either the interconnection between the planetary gearsets, or another member of the planetary gearsets, or selectively connects a member of the second or third planetary gearset to a stationary member of the transmission, such as a housing.

In still a further aspect of the present invention, a fifth of the torque-transmitting mechanisms selectively connects either a member of the first, second or third planetary gearset with either the input shaft, output shaft, another member of the first, second, and third planetary gearsets, or a member of the first, second or third planetary gearset with the stationary member of the transmission.

DESCRIPTION OF THE DRAWINGS

FIG. 19 is a schematic representation of a powertrain incorporating another planetary gear arrangement that is a member of the family of transmissions incorporating the present invention.

FIG. 20 is a truth table and chart describing some of the operating characteristics of the transmission depicted in FIG. 19.

DESCRIPTION OF EXEMPLARY EMBODIMENTS

Figures 1, 2:
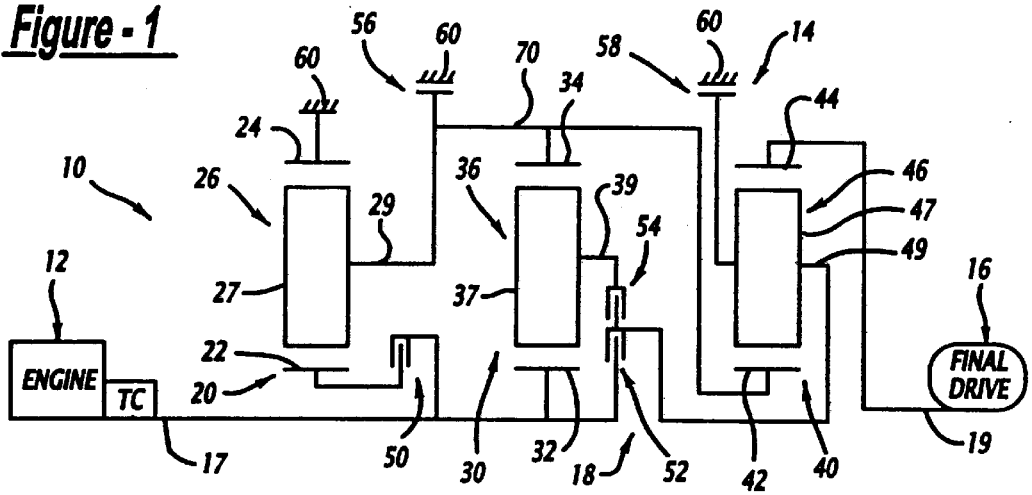
FIG. 1 is a schematic representation of a powertrain having a multi-speed transmission selected from the family of transmissions incorporating the present invention.
FIG. 2 is a truth table and chart describing some of the operating characteristics of the transmission depicted in FIG. 1.

Referring to the drawings, wherein like characters represent the same or corresponding parts throughout the several views, there is seen in FIG. 1, a powertrain 10 including a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30 and 40, and five torque-transmitting mechanisms including three rotating type torque-transmitting mechanisms, or clutches, 50, 52, and 54, and two stationary type torque-transmitting mechanisms, or brakes, 56 and 58.

The planetary gearset 20 includes a sun gear member 22, a ring gear member 24, and a planet carrier assembly member 26. The planet carrier assembly member 26 includes a plurality of pinion gears 27 rotatably mounted on a carrier 29 and disposed in meshing relationship with both the sun gear member 22 and the ring gear member 24.

The planetary gearset 30 includes a sun gear member 32, a ring gear member 34, and a planet carrier assembly member 36 which includes a plurality of pinion gears 37 rotatably mounted on a carrier 39 and disposed in meshing relationship with the sun gear member 32 and the ring gear member 34.

The planetary gearset 40 includes a sun gear member 42, a ring gear member 44, and a planet carrier assembly member 46. The planetary carrier assembly member 46 includes a plurality of pinion gears 47 rotatably mounted on a carrier 49 and disposed in meshing relationship with the sun gear member 42 and the ring gear member 44.

The sun gear member 32 is continuously connected with the input shaft 17 and the ring gear member 44 is continuously connected with the output shaft 19. The planet carrier assembly member 26, the ring gear member 34, and the sun gear member 42 are continuously interconnected by an interconnecting member 70. The ring gear member 24 is continuously connected to a ground member or transmission housing 60.

The interconnecting member 70 is selectively interconnectable with the housing 60 through the torque-transmitting mechanism 56. The input shaft 17 is selectively connectible with the sun gear member 22 through the torque-transmitting mechanism 50, and with the planet carrier assembly member 46 through the torque-transmitting mechanism 52. The planet carrier assembly member 36 is selectively connectible with the planet carrier assembly member 46 through the torque-transmitting mechanism 54. The planet carrier assembly member 46 is selectively connectible with the transmission housing 60 through the torque-transmitting mechanism 58.

As described in FIG. 2, the torque-transmitting mechanisms 50, 52, 54, 56, and 58 are selectively engaged in combinations of two to establish six forward speed ratios and one reverse speed ratio in the planetary gear arrangement 18 between the input shaft 17 and the output shaft 19. A neutral condition is also provided during which the torque-transmitting mechanism 58 may be engaged.

The reverse drive ratio is selectively established by the engagement of the torque-transmitting mechanisms 50 and 58. During the reverse ratio, the sun gear member 22 is driven by the input shaft 17, and the planet carrier assembly member 26 is driven at a speed determined by the speed of the sun gear member 22 and the ring gear/sun gear tooth ratio of the planetary gearset 20. The sun gear member 42 rotates in unison with the planet carrier assembly member 26. The ring gear member 44 and output shaft 19 are driven in reverse at a speed determined by the speed of the sun gear member 42 and the ring gear/sun gear tooth ratio of the planetary gearset 40. The numerical value of the reverse drive ratio is determined by the ring gear/sun gear tooth ratios of the planetary gearsets 20 and 40.

The first forward speed ratio, or drive ratio, is established with the engagement of the torque-transmitting mechanisms 54 and 58. It should be noted that the torque-transmitting mechanism 58 can be maintained engaged through the neutral condition as an interchange from forward to reverse is made. The engagement of the torque-transmitting mechanisms 54 and 58 maintains the planet carrier assembly member 36 and the planet carrier assembly member 46 stationary. The sun gear member 32 is rotated forwardly by the input shaft 17 resulting in reverse rotation of the ring gear member 34 at a speed determined by the speed of the sun gear member 32 and the ring gear/sun gear tooth ratio of the planetary gearset 30. The sun gear member 42 rotates in unison with the ring gear member 34 such that the output shaft 44 is driven forwardly at a speed determined by the speed of the sun gear member 42 and the ring gear/sun gear tooth ratio of the planetary gearset 40. The numerical value of the first forward speed ratio is determined by the ring gear/sun gear tooth ratios of the planetary gearsets 30 and 40.

The second forward speed ratio is established by the interchange of the torque-transmitting mechanisms 56 and 58, while the torque-transmitting mechanism 54 remains engaged. This is a single transition ratio interchange. During the second forward speed ratio, the planet carrier assembly member 36 is driven forwardly at a speed determined by the speed of the sun gear member 32 and the ring gear/sun gear tooth ratio of the planetary gearset 30. The planet carrier assembly member 46 is also driven at this speed. The ring gear member 44 and therefore output shaft 19 are driven forwardly at a speed determined by the speed of the planet carrier assembly member 46 and the ring gear/sun gear tooth ratio of the planetary gearset 40. The overall numerical value of the second forward speed ratio is determined by the ring gear/sun gear tooth ratios of the planetary gearsets 30 and 40.

The third forward speed ratio is established by the interchange of the torque-transmitting mechanisms 56 and 50. During the third forward speed ratio, the planet carrier assembly member 26, ring gear member 34, and sun gear member 42 are driven forwardly at a speed determined by the speed of the sun gear member 22 and the ring gear/sun gear tooth ratio of the planetary gearset 20. The planet carrier assembly member 36 and the planet carrier assembly member 46 are driven forwardly at a speed determined by the speed of the sun gear member 32, the ring gear member 34, and the ring gear/sun gear tooth ratio of planetary gearset 30. The ring gear member 44 and output shaft 19 are driven forwardly at a speed determined by the speed of sun gear member 42, the speed of planet carrier assembly member 46, and the ring gear/sun gear tooth ratio of the planetary gearset 40. The overall numerical ratio of the third forward speed ratio is determined by the planetary gearsets 20, 30, and 40.

The fourth forward speed ratio is established by the interchange of the torque-transmitting mechanisms 50 and 52. This is a single transition interchange. During the fourth forward speed ratio, the planetary gearset 30 and therefore the planetary gearset 40 are driven at a 1:1 ratio at a speed determined by the speed of the input shaft 17. The overall numerical value of the fourth forward speed ratio is one.

The fifth forward speed ratio is established by the interchange of the torque-transmitting mechanisms 54 and 50 while the torque-transmitting mechanism 52 remains engaged. This is a single transition ratio interchange. During the fifth forward speed ratio, the planet carrier assembly member 26, ring gear member 34 and sun gear member 42 are driven forwardly at a speed determined by the speed of the sun gear member 20 and the ring gear/sun gear tooth ratio of the planetary gearset 20. The ring gear member 44 and output shaft 19 are driven forwardly at a speed determined by the speed of the sun gear member 42, the speed of the planet carrier assembly member 46, and the ring gear/sun gear tooth ratio of the planetary gearset 40. The overall numerical value of the fourth forward speed ratio is determined by the planetary gearsets 20 and 40.

The sixth forward speed ratio is established by the interchange of the torque-transmitting mechanisms 50 and 56. The torque-transmitting mechanism 52 remains engaged during the sixth forward speed ratio such that the interchange is a single transition ratio interchange. During the sixth forward speed ratio, the planet carrier assembly member 46 is driven at the speed of the input shaft 17 through the torque-transmitting mechanisms 52. The ring gear member 44 and the output shaft 19 are driven forwardly at an increased speed determined by the speed of the planet carrier assembly member 46 and the ring gear/sun gear tooth ratio of the planetary gearset 40. The overall numerical value of the sixth forward speed ratio is determined by the ring gear/sun gear tooth ratio of the planetary gearset 40.

The truth table in FIG. 2 describes the interchange sequence of the torque-transmitting mechanisms 50, 52, 54, 56, and 58 for the forward speed ratios and the reverse ratio. The numerical values given in FIG. 2 are computed from the ring gear/sun gear tooth ratios of the planetary gearsets 20, 30, and 40, also as given in FIG. 2. The tooth ratio R1/S1 is for the ratio of the ring gear member 24 to the sun gear member 22 of the planetary gearset 20; the tooth ratio R2/S2 is for the ratio of the ring gear member 34 to the sun gear member 32 of the planetary gearset 30; and the tooth ratio R3/S3 is for the ratio of the ring gear member 44 to the sun gear member 42 of the planetary gearset 40.

The numerical value of the ratio steps is also given in FIG. 2. For example, the numerical value between the first ratio and second ratio is 2.06 when the given tooth ratios are employed. It should also be noted in FIG. 2 that the double step interchanges, such as first to third; second to fourth; third to fifth; and fourth to sixth, are also single transition ratio interchanges. This simplifies the use of skip-shifting with the conventional electro-hydraulic controls that are utilized with transmissions of the type described above. The torque-transmitting mechanisms 50, 52, 54, 56, and 58 are preferably selectively actuated hydraulic fluid-operated mechanisms that include friction devices to provide either the torque transmission during rotation or the stationary establishment of the various gear members. These types of torque-transmitting mechanisms are well known in the art of power transmissions.

Figures 3, 4:
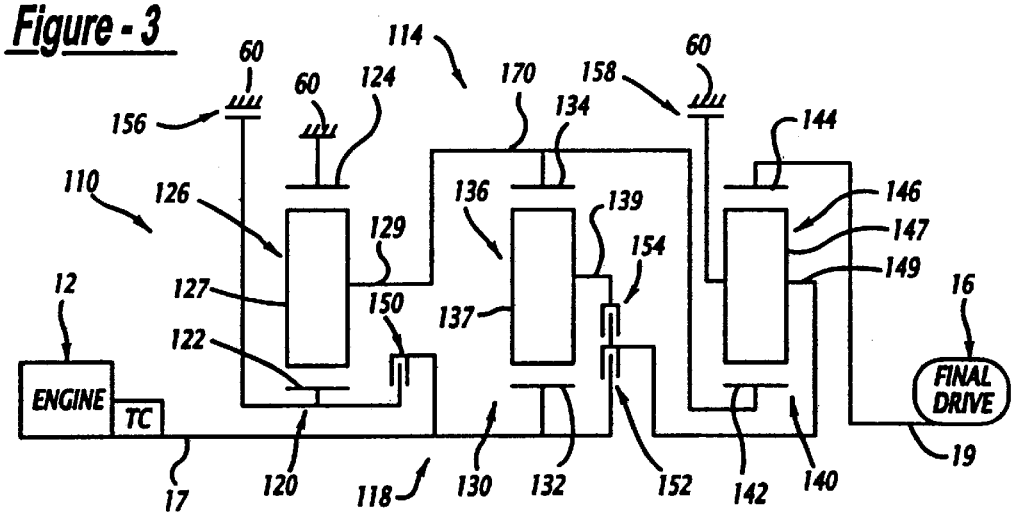
FIG. 3 is a schematic representation of a powertrain incorporating another planetary gear arrangement that is a member of the family of transmissions incorporating the present invention.
FIG. 4 is a truth table and chart describing some of the operating characteristics of the transmission depicted in FIG. 3.

A powertrain 110, shown in FIG. 3, includes the conventional engine and torque converter 12, a multi-speed planetary transmission 114, and the conventional final drive mechanism 16. The planetary transmission 114 includes the input shaft 17, a planetary gear arrangement 118, and the output shaft 19. The input shaft 17 is continuously connected with the engine and torque converter 12, and the output shaft 19 is continuously connected with the final drive mechanism 16. The planetary gear arrangement 118 includes three planetary gearsets 120, 130, and 140 and five torque-transmitting mechanisms 150, 152, 154, 156, and 158.

The planetary gearset 120 includes a sun gear member 122, a ring gear member 124, and a planet carrier assembly member 126 which includes a plurality of pinion gears 127 rotatably mounted on a carrier 129 and disposed in meshing relationship with the sun gear member 122 and the ring gear member 124.

The planetary gearset 130 includes a sun gear member 132, a ring gear member 134, and a planet carrier assembly member 136 which includes a plurality of pinion gears 137 rotatably mounted on a carrier 139 and disposed in meshing relationship with the sun gear member 132 and the ring gear member 134.

The planetary gearset 140 includes a sun gear member 142, a ring gear member 144, and a planet carrier assembly member 146 which includes a plurality of pinion gears 147 rotatably mounted on a carrier 149 and disposed in meshing relationship with the sun gear member 142 and the ring gear member 144.

The planetary gear arrangement 118 also includes three rotating type torque-transmitting mechanisms 150, 152, and 154, and two stationary type torque-transmitting mechanisms 156 and 158. These torque-transmitting mechanisms are, as explained above, preferably controlled by a conventional electro-hydraulic control system, not shown, that includes a preprogrammed digital computer.

The input shaft 17 is continuously connected with the sun gear member 132 and the output shaft 19 is continuously connected with the ring gear member 144. The planet carrier assembly member 126, the ring gear member 134, and the sun gear member 142 are continuously interconnected by an interconnecting member 170. The ring gear member 124 is continuously connected with the transmission housing 60. The sun gear member 122 is selectively connectible with the input shaft 17 through the torque-transmitting mechanism 150, and with the transmission housing 60 through the torque-transmitting mechanism 156. The planet carrier assembly member 146 is selectively connectible with the input shaft 17 through the torque-transmitting mechanism 152, the planet carrier assembly member 136 through the torque-transmitting mechanism 154, and with the transmission housing 60 through the torque-transmitting mechanism 158.

The truth table in FIG. 4 describes the engagement schedule for the torque-transmitting mechanisms to establish the six forward speed ratios and the reverse speed ratio. To establish the reverse speed ratio, the torque-transmitting mechanisms 150 and 158 are engaged. The sun gear member 122 is driven by the input shaft 17 through the torque-transmitting mechanism 150. The planet carrier assembly member 126, ring gear member 134, and sun gear member 142 are driven forwardly at a speed determined by the speed of the sun gear member 122 and the ring gear/sun gear tooth ratio of the planetary gearset 120. The ring gear member 144 and output shaft 19 are driven in reverse at a speed determined by the speed of the sun gear member 142 and the ring gear/sun gear tooth ratio of the planetary gearset 140. The overall numerical value of the reverse speed ratio is determined by the ring gear/sun gear tooth ratios of the planetary gearsets 120 and 140. The torque-transmitting mechanism 158 may remain engaged during the neutral condition.

To establish the first forward speed ratio, the torque-transmitting mechanisms 158 and 154 are engaged. This establishes the planet carrier assembly member 136 and planet carrier assembly member 146 as reaction members within the transmission. The ring gear member 134 and sun gear member 142 are driven in reverse at a speed determined by the speed of the sun gear member 132 and the ring gear/sun gear tooth ratio of the planetary gearset 130. The ring gear member 144 and therefore output shaft 19 are driven forwardly at a reduced speed ratio determined by the speed of sun gear member 142 and the ring gear/sun gear tooth ratio of the planetary gearset 140. The overall numerical value of the first forward speed ratio is determined by the ring gear/sun gear tooth ratios of the planetary gearsets 130 and 140.

The second forward speed ratio is established by the interchange of the torque-transmitting mechanisms 158 and 156, while the torque-transmitting mechanism 154 remains engaged. This is a single transition ratio interchange. The engagement of the torque-transmitting mechanism 156 maintains the members of the planetary gearset 120 stationary as well as maintaining the ring gear member 134 and sun gear member 142 stationary. The planet carrier assembly member 136 and planet carrier assembly member 146 are driven forwardly at a speed determined by the speed of the sun gear member 132 and the ring gear/sun gear tooth ratio of the planetary gearset 130. The ring gear member 144 and therefore output shaft 19 are driven forwardly at a speed determined by the speed of the planet carrier assembly member 146 and the ring gear/sun gear tooth ratio of the planetary gearset 140. The overall numerical value of the second forward speed ratio is determined by the ring gear/sun gear tooth ratios of the planetary gearsets 130 and 140.

To establish the third forward speed ratio, the torque-transmitting mechanisms 156 and 150 are interchanged. This is a single transition interchange. The planet carrier assembly member 126, ring gear member 134, and sun gear member 142 are driven forwardly at a speed determined by the speed of the sun gear member 122 and the ring gear/sun gear tooth ratio of the planetary gearset 120. The planet carrier assembly member 136 and planet carrier assembly member 146 are driven forwardly at a speed determined by the speed of the sun gear member 130, the speed of the ring gear member 134, and ring gear/sun gear tooth ratio of the planetary gearset 130. The ring gear member 144 and output shaft 19 are driven forwardly at a reduced speed determined by the speed of the sun gear member 142, the speed of the planet carrier assembly member 146, and the ring gear/sun gear tooth ratio of the planetary gearset 140. The overall numerical ratio of the third forward speed ratio is determined by the ring gear/sun gear tooth ratios of the planetary gearsets 120, 130, and 140.

The fourth forward speed ratio is established by the interchange of the torque-transmitting mechanisms 150 and 152. This is a single transition ratio interchange. During the fourth forward speed ratio, the planetary gearsets 130 and 140 are essentially in a 1:1 ratio as determined by the engagement of the torque-transmitting mechanisms 152 and 154. Therefore, the input shaft 17 and output shaft 19 rotate in unison. The overall numerical ratio of the fourth forward speed ratio is one.

The fifth forward speed ratio is established by the interchange of the torque-transmitting mechanisms 154 and 150. This is a single transition ratio interchange. The planet carrier assembly member 146 is driven at the speed of the input shaft 17. The planet carrier assembly member 126, ring gear member 134, and sun gear member 142 are driven forwardly at a speed determined by the speed of sun gear member 122 and the ring gear/sun gear tooth ratio of the planetary gearset 120. The ring gear member 144 and therefore output shaft 19 are driven forwardly at an increased speed ratio determined by the speed of the sun gear member 142, the speed of the planet carrier assembly member 146, and the ring gear/sun gear tooth ratio of the planetary gearset 140. The overall numerical value of the fifth forward speed ratio is determined by the ring gear/sun gear tooth ratios of planetary gearsets 120 and 140.

The sixth forward speed ratio is established by the interchange of the torque-transmitting mechanisms 150 and 156. This establishes the interconnecting member 170 and the gear members connected thereto as reaction members within the transmission. The planet carrier assembly member 146 is driven forwardly at the speed of the input shaft 17 through the torque-transmitting mechanism 152. The ring gear member 144 and therefore output shaft 19 are driven forwardly at an increased speed ratio determined by the speed of the planet carrier assembly member 146 and the ring gear/sun gear tooth ratio of the planetary gearset 140. The overall numerical ratio of the sixth forward speed ratio is determined by the planetary gearset 140.

The truth table and chart in FIG. 4 describe the interchange sequence of the torque-transmitting mechanisms 150, 152, 154, 156, and 158 during the establishment of the six forward speed ratios and one reverse speed ratio. In FIG. 4 there is also described the ring gear/sun gear tooth ratios for the planetary gearsets 120, 130, and 140. Further, FIG. 4 describes the step ratios between adjacent gear ratios. For example, the numerical step between the first ratio and second ratio is 2.06. As can be seen from the tooth ratio of FIG. 4, the ratio interchanges between adjacent steps in the forward direction are single transition ratio interchanges, and also the double step ratio interchanges during the forward speed ratios are also single transition interchanges.

Figures 5, 6:
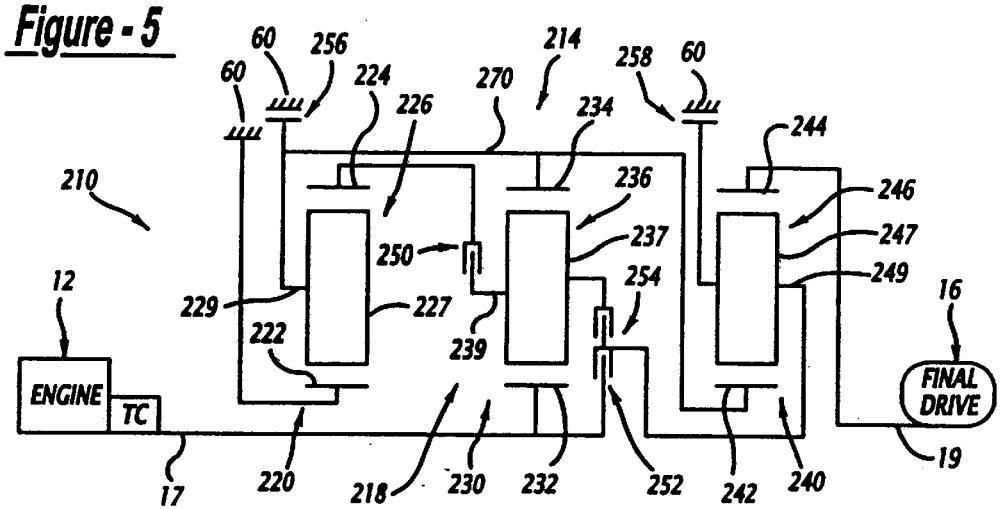
FIG. 5 is a schematic representation of a powertrain incorporating another planetary gear arrangement that is a member of the family of transmissions incorporating the present invention.
FIG. 6 is a truth table and chart describing some of the operating characteristics of the transmission depicted in FIG. 5.

A powertrain 210, shown in FIG. 5, includes the conventional engine and torque converter 12, a multi-speed planetary transmission 214, and the conventional final drive 16. The planetary transmission 214 includes the input shaft 17, a planetary gear arrangement 218, and the output shaft 19. The input shaft 17 is continuously connected with the engine and torque converter 12, and the output shaft 19 is continuously connected with the final drive mechanism 16. The planetary gear arrangement 218 includes three planetary gearsets 220, 230, and 240 and five torque-transmitting mechanisms 250, 252, 254, 256, and 258.

The planetary gearset 220 includes a sun gear member 222, a ring gear member 224, and a planet carrier assembly member 226 which includes a plurality of pinion gears 227 rotatably mounted on a carrier 229 and disposed in meshing relationship with the sun gear member 222 and the ring gear member 224.

The planetary gearset 230 includes a sun gear member 232, a ring gear member 234, and a planet carrier assembly member 236 which includes a plurality of pinion gears 237 rotatably mounted on a carrier 239 and disposed in meshing relationship with the sun gear member 232 and the ring gear member 234.

The planetary gearset 240 includes a sun gear member 242, a ring gear member 244, and a planet carrier assembly member 246 which includes a plurality of pinion gears 247 rotatably mounted on a planet carrier 249 and disposed in meshing relationship with the sun gear member 242 and the ring gear member 244.

The sun gear member 232 is continuously connected with the input shaft 17 and the ring gear member 244 is continuously connected with the output shaft 19. The planet carrier assembly member 226, the ring gear member 234, and the sun gear member 242 are all continuously interconnected by an interconnecting member 270. The sun gear member 222 is continuously connected with the transmission housing 60. The planet carrier assembly member 236 is selectively connectible with the ring gear member 224 through the torque-transmitting mechanism 250, and with the planet carrier assembly member 246 through the selectively actuatable torque-transmitting mechanism 254. The planet carrier assembly member 246 is selectively connectible with the input shaft 17 through the torque-transmitting mechanism 252, and with the transmission housing 60 through the torque-transmitting mechanism 258. The interconnecting member 270 and the planetary members connected therewith is selectively connectible with the transmission housing 60 through the torque-transmitting mechanism 256.

The truth table in FIG. 6 describes the torque-transmitting mechanism engagement sequence that occurs for the reverse drive ratio and for the six forward speed ratios. The table also indicates that during the neutral condition the torque-transmitting mechanism 258 may also remain engaged.

During the reverse speed ratio, the planet carrier assembly member 236 and the ring gear member 224 are driven forwardly at a speed determined by the speed of the sun gear member 232, the speed of ring gear member 234, and the ring gear/sun gear tooth ratio of the planetary gearset 230. The planet carrier assembly member 226, the ring gear member 234, and the sun gear member 242 are rotated forwardly at a reduced ratio determined by the speed of the ring gear member 224 and the ring gear/sun gear tooth ratio of the planetary gearset 220. The output shaft 19 and ring gear member 244 are driven in reverse at a reduced ratio determined by the speed of the sun gear member 242 and the ring gear/sun gear tooth ratio of the planetary gearset 240. The overall numerical value of the reverse speed ratio is determined by ring gear/sun gear tooth ratios of the planetary gearsets 220, 230, and 240.

The first forward speed ratio is established with the engagement of the torque-transmitting mechanisms 254 and 258. During the first forward speed ratio, the ring gear member 234 and sun gear member 242 are driven in reverse at a speed determined by the speed of sun gear member 232 and the ring gear/sun gear tooth ratio of the planetary gearset 230. The ring gear member 244 and output shaft 19 are driven forwardly at a speed determined by the speed of the sun gear member 242 and the ring gear/sun gear tooth ratio of the planetary gearset 240.

The second forward speed ratio is established with the interchange of the torque-transmitting mechanisms 256 and 258. During the second forward speed ratio, the planet carrier assembly member 236 and planet carrier assembly member 246 are driven forwardly at a reduced speed determined by the speed of the sun gear member 232 and the ring gear/sun gear tooth ratio of the planetary gearset 230. The ring gear member 244 and the output shaft 19 are driven forwardly at a reduced speed determined by the speed of the planet carrier assembly member 246 and the ring gear/sun gear tooth ratio of the planetary gearset 240. The overall numerical value of the second forward speed ratio is determined by the ring gear/sun gear tooth ratios of the planetary gearsets 230 and 240. The first to second interchange is a single transition interchange.

The third forward speed ratio is established by the interchange of the torque-transmitting mechanisms 256 and 250. This is a single transition ratio interchange. During the third forward speed ratio, the planet carrier assembly member 236, the ring gear member 224, and the planet carrier assembly member 246 are driven forwardly at a speed determined by the speeds of sun gear member 232, the ring gear member 234, and the ring gear/sun gear tooth ratio of the planetary gearset 230. The planet carrier assembly member 226, ring gear member 234, and sun gear member 242 are driven forwardly at a reduced speed determined by the speed of the ring gear member 224 and the ring gear/sun gear tooth ratio of the planetary gearset 220. The ring gear member 244 is driven forwardly at a reduced speed determined by the speed of the sun gear member 242, the speed of the planet carrier assembly member 246, and the ring gear/sun gear tooth ratio of the planetary gearset 240. The overall numerical value of the third forward speed ratio is determined by the ring gear/sun gear tooth ratios of the planetary gearsets 220, 230, and 240.

The fourth forward speed ratio is established with the engagement of the torque transmitting mechanisms 252 and 254. The three/four ratio interchange is a single transition interchange. This causes the planetary gearsets 230 and 240 to rotate in unison such that the fourth forward speed ratio is a direct drive or one to one ratio.

The fifth forward speed ratio is established with the engagement of the torque transmitting mechanisms 250 and 252. The four/five ratio interchange is a single transition interchange. During the fifth forward speed ratio, the planet carrier assembly member 236 and ring gear member 224 are driven at a speed determined by the speed of the sun gear member 232, the ring gear member 234 and the ring gear/sun gear tooth ratio of the planetary gearset 230. The interconnecting member 270 is rotated forwardly at a speed determined by the speed of the ring gear member 224 and the tooth ratio of the planetary gearset 220. The ring gear member 244 and output shaft 19, are driven forwardly at an increased speed determined by the speed of the planet carrier assembly member 246 (input), the speed of the sun gear member 242, and the tooth ratio of the planetary gearset 240. The numerical value of the fifth forward speed ratio is determined by the tooth ratios of all three planetary gearsets 220, 230, and 240.

The sixth forward speed ratio is established with the engagement of the torque transmitting mechanisms 252 and 256. The five/six interchange is a single transition interchange. During the sixth forward speed ratio, the sun gear member 242 is held stationary and the planet carrier assembly member 246 is driven by the input shaft 17. The ring gear member 244 and the output shaft 19 are driven forwardly at an increased speed determined by the speed of the planet carrier assembly member 246 and the tooth ratio of the planetary gearset 240.

As explained above, the truth table of FIG. 6 describes the necessary engagement schedule for these ratios. The chart of FIG. 6 describes the ratio steps, that is, the ratio steps between adjacent ratios. For example, the step between the first ratio and the second ratio is 1.86. The truth table shows that the single step interchanges are all single transition interchanges, as are all of the double step interchanges, such as first to third and second to fourth, as being single transition interchanges.

Figures 7, 8:
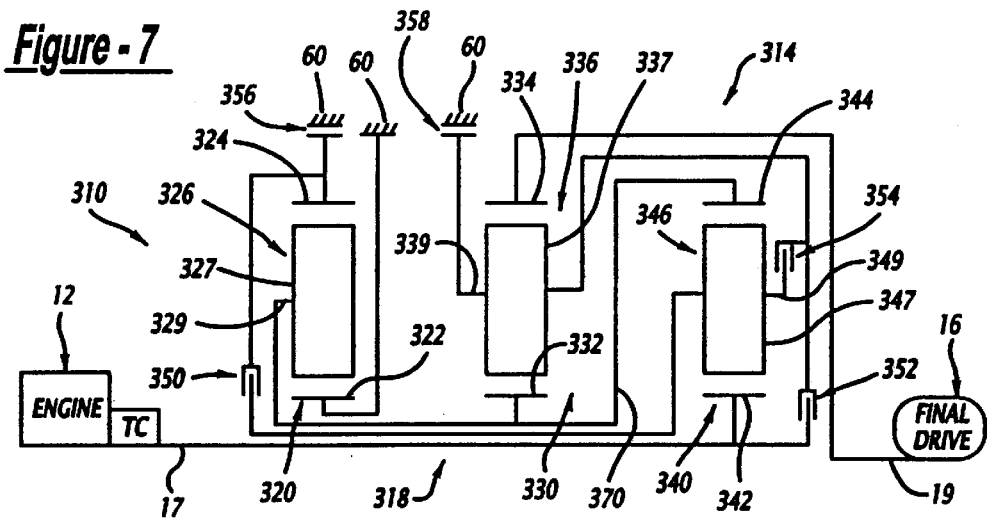
FIG. 7 is a schematic representation of a powertrain incorporating another planetary gear arrangement that is a member of the family of transmissions incorporating the present invention.
FIG. 8 is a truth table and chart describing some of the operating characteristics of the transmission depicted in FIG. 7.

A powertrain 310, shown in FIG. 7, includes the conventional engine and torque converter 12, a multi-speed planetary transmission 314, and the conventional final drive 16. The planetary transmission 314 includes the input shaft 17, a planetary gear arrangement 318, and the output shaft 19. The input shaft 17 is continuously connected with the engine and torque converter 12, and the output shaft 19 is continuously connected with the final drive mechanism 16. The planetary gear arrangement 318 includes three planetary gearsets 320, 330, and 340 and five torque-transmitting mechanisms 350, 352, 354, 356, and 358.

The planetary gearset 320 includes a sun gear member 322, a ring gear member 324, and a planet carrier assembly member 326 which includes a plurality of pinion gears 327 rotatably mounted on a carrier 329 and disposed in meshing relationship with the sun gear member 322 and the ring gear member 324.

The planetary gearset 330 includes a sun gear member 332, a ring gear member 334, and a planet carrier assembly member 336 which includes a plurality of pinion gears 337 rotatably mounted on a carrier 339 and disposed in meshing relationship with the sun gear member 332 and the ring gear member 334.

The planetary gearset 340 includes a sun gear member 342, a ring gear member 344, and a planet carrier assembly member 346 which includes a plurality of pinion gears 347 rotatably mounted on a planet carrier 349 and disposed in meshing relationship with the sun gear member 342 and the ring gear member 344.

The sun gear member 342 is continuously connected with the input shaft 17, and the ring gear member 334 is continuously connected with the output shaft 19. The planet carrier assembly member 326, the sun gear member 332, and the ring gear member 344 are continuously interconnected by an interconnecting member 370. The ring gear member 324 is selectively connectible with the planet carrier assembly member 346 through the torque-transmitting mechanism 350, and with the transmission housing 60 through the torque-transmitting mechanism 356. The sun gear member 322 is continuously connected with the transmission housing 60. The planet carrier assembly member 336 is selectively connectible with the transmission housing 60 through the torque-transmitting mechanism 358, with the planet carrier assembly member 346 through the torque-transmitting mechanism 354, and with the input shaft 17 through the torque-transmitting mechanism 352.

As described in FIG. 8, the torque-transmitting mechanisms are engaged in combinations of two to provide a reverse speed ratio and six forward speed ratios. It should also be noted in the truth table of FIG. 8 that the torque-transmitting mechanism 358 can remain engaged through the neutral condition.

During the reverse speed ratio, the planet carrier assembly member 346 and the ring gear member 324 are driven forwardly at a speed determined by the speed of the sun gear member 342, the speed of the ring gear member 344, and the ring gear/sun gear tooth ratio of the planetary gearset 340. The planet carrier assembly member 326, sun gear member 332, and ring gear member 344 are rotated forwardly at a speed determined by the speed of the ring gear member 324 and the ring gear/sun gear tooth ratio of the planetary gearset 320. The ring gear member 334 and output shaft 19 are driven in reverse at a speed determined by the speed of the sun gear member 332 and the ring gear/sun gear tooth ratio of the planetary gearset 330. The overall numerical value of the reverse speed ratio is determined by the ring gear/sun gear tooth ratios of the planetary gearsets 320, 330, and 340.

The first forward speed ratio is established with the engagement of the torque-transmitting mechanisms 358 and 354. During the first forward speed ratio, the planet carrier assembly member 346 and planet carrier assembly member 336 are held stationary. The ring gear member 344 and sun gear member 332 are driven in reverse at a speed determined by the speed of sun gear member 342 and the ring gear/sun gear tooth ratio of the planetary gearset 340. The ring gear member 334 and output shaft 19 are driven forwardly at a speed determined by the speed of sun gear member 332 and the ring gear/sun gear tooth ratio of the planetary gearset 330. The overall numerical value of the first forward speed ratio is determined by the ring gear/sun gear tooth ratios of the planetary gearsets 330 and 340.

The second forward speed ratio is established with the interchange of the torque-transmitting mechanisms 358 and 356. The engagement of the torque-transmitting mechanism 356 and the members of the planetary gearset 320 are held stationary as is the sun gear member 332 and the ring gear member 344. During the second forward speed ratio, the planet carrier assembly member 346 and the planet carrier assembly member 336 are driven forwardly at a reduced speed determined by the speed of the sun gear member 342 and the ring gear/sun gear tooth ratio of the planetary gearset 340. The ring gear member 334 and output shaft 19 are driven forwardly at a reduced speed determined by the speed of the planet carrier assembly member 336 and the ring gear/sun gear tooth ratio of the planetary gearset 330. The overall numerical value of the second forward speed ratio is determined by the ring gear/sun gear tooth ratios of the planetary gearsets 330 and 340.

The third forward speed ratio is established by the interchange of the torque-transmitting mechanisms 356 and 350. During the third forward speed ratio the planet carrier assembly member 346 and ring gear member 324 are driven forwardly at a speed determined by the speed of sun gear member 342, the speed of the ring gear member 344, and the ring gear/sun gear tooth ratio of the planetary gearset 340. The planet carrier assembly member 326, sun gear member 332, and ring gear member 344 are driven forwardly at a speed determined by the speed of ring gear member 324 and the ring gear/sun gear tooth ratio of the planetary gearset 320. The ring gear member 334 and output shaft 19 are driven forwardly at a speed determined by the speed of the sun gear member 332, the speed of the planet carrier assembly member 336, and the ring gear/sun gear tooth ratio of the planetary gearset 330. The overall numerical value of the third forward speed ratio is determined by the ring gear/sun gear tooth ratios of the planetary gearsets 320, 330, and 340.

The fourth forward speed ratio is established with the engagement of the torque transmitting mechanisms 352 and 354. The three/four interchange is a single transition interchange. This causes the input shaft 17, the planetary gearsets 330 and 340, and the output shaft 19 to rotate in unison. The fourth forward speed ratio is a one-to-one ratio.

The fifth forward speed ratio is established with the engagement of the torque transmitting mechanisms 350 and 352. The four/five interchange is a single transition interchange. During the fifth forward speed ratio, the sun gear member 342 and the planet carrier assembly member 336 are rotated in unison with the input shaft 17 and the ring gear member 324 and the planet carrier assembly member 346 rotate in unison. The planet carrier assembly member 346 and the ring gear member 324 are driven at a speed determined by the speed of the sun gear member 342, the speed of the interconnecting member 370 and the tooth ratio of the planetary gearset 340. The planet carrier assembly member 326 and the interconnecting member 370 are driven forwardly at a speed determined by the speed of the ring gear member 324 and the tooth ratio of the planetary gearset 320. The ring gear member 334 and the output shaft 19 are driven forwardly at an increased speed determined by the speed of the planet carrier assembly member 336, the speed of the sun gear member 332, and the tooth ratio of the planetary gearset 330. The numerical value of the fifth forward speed ratio is determined by the tooth ratios of all three planetary gearsets 320, 330, and 340.

The sixth forward speed ratio is established by the engagement of the torque transmitting mechanisms 352 and 356. The five/six interchange is a single transition interchange. During the sixth forward speed ratio, the sun gear member 332 is held stationary and the planet carrier assembly member 336 is driven forwardly by the input shaft 17. The ring gear member 334 and the output shaft 19 are rotated forwardly at an increased speed determined by the speed of the planet carrier assembly member 336 and the tooth ratio of the planetary gearset 330. The numerical value of the sixth forward speed ratio is determined by the tooth ratio of the planetary gearset 330.

The truth table and chart shown in FIG. 8 describe the necessary engagement schedule for the torque-transmitting mechanisms. Those skilled in the art will recognize that each of the single step forward interchanges are single transition interchanges as are each of the double step forward interchanges. The chart of FIG. 8 describes the ratio steps between adjacent ratios, for example, the ratio step between the first ratio and second ratio is 1.92.

Figures 9, 10:
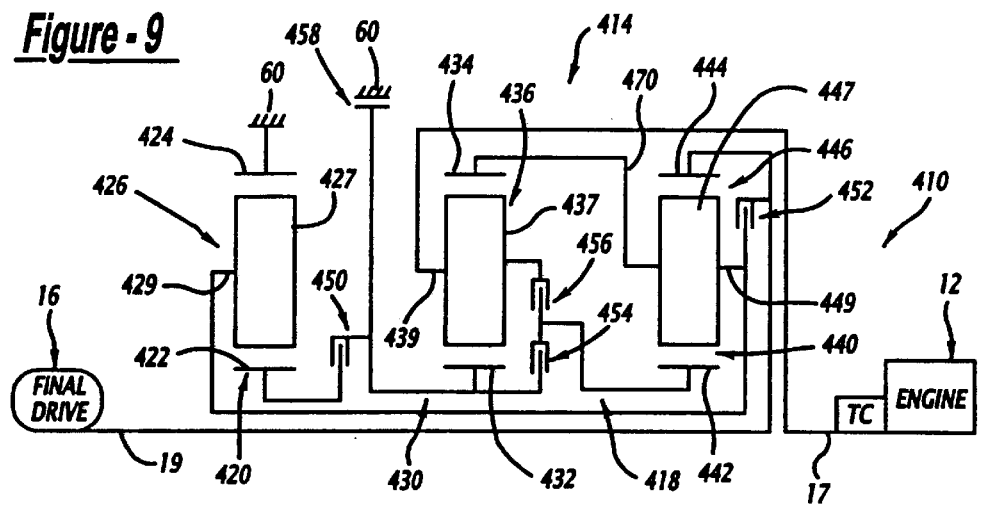
FIG. 9 is a schematic representation of a powertrain incorporating another planetary gear arrangement that is a member of the family of transmissions incorporating the present invention.
FIG. 10 is a truth table and chart describing some of the operating characteristics of the transmission depicted in FIG. 9.

A powertrain 410, shown in FIG. 9, includes the conventional engine and torque converter 12, a multi-speed planetary transmission 414, and the conventional final drive 16. The planetary transmission 414 includes the input shaft 17, a planetary gear arrangement 418, and the output shaft 19. The input shaft 17 is continuously connected with the engine and torque converter 12, and the output shaft 19 is continuously connected with the final drive mechanism 16. The planetary gear arrangement 418 includes three planetary gearsets 420, 430, and 440 and five torque-transmitting mechanisms 450, 452, 454, 456, and 458.

The planetary gearset 420 includes a sun gear member 422, a ring gear member 424, and a planet carrier assembly member 426 which includes a plurality of pinion gears 427 rotatably mounted on a carrier 429 and disposed in meshing relationship with the sun gear member 422 and the ring gear member 424.

The planetary gearset 430 includes a sun gear member 432, a ring gear member 434, and a planet carrier assembly member 436 which includes a plurality of pinion gears 437 rotatably mounted on a carrier 439 and disposed in meshing relationship with the sun gear member 432 and the ring gear member 434.

The planetary gearset 440 includes a sun gear member 442, a ring gear member 444, and a planet carrier assembly member 446 which includes a plurality of pinion gears 447 rotatably mounted on a planet carrier 449 and disposed in meshing relationship with the sun gear member 442 and the ring gear member 444.

The planet carrier assembly member 436 is continuously connected with the input shaft 17, and the ring gear member 444 is continuously connected with the output shaft 19. The ring gear member 424 is continuously connected with the transmission housing 60. The planet carrier assembly member 426, the ring gear member 434, and the planet carrier assembly member 446 are continuously interconnected by an interconnecting member 470. The interconnecting member 470 is selectively connectible with the ring gear member 444 and output shaft 19 through the torque-transmitting mechanism 452. The sun gear member 432 is selectively connectible with the sun gear member 422 through the torque-transmitting mechanism 450, with the sun gear member 442 through the torque-transmitting mechanism 454, and with the transmission housing 60 through the torque-transmitting mechanism 458. The planet carrier assembly member 436 and input shaft 17 are selectively connectible with the sun gear member 442 through the torque-transmitting mechanism 456.

The truth table, shown in FIG. 10, describes the torque-transmitting mechanism engagement schedule which provides a reverse speed and six forward speeds. As is seen in the truth table, the torque-transmitting mechanisms are engaged in combinations of two to provide these ratios.

To establish the reverse speed ratio, the torque-transmitting mechanisms 450 and 454 are selectively engaged. During the reverse speed ratio, the sun gear member 432, sun gear member 422, and sun gear member 442 are rotated at a speed determined by the speed of the planet carrier assembly member 436, the speed of ring gear member 434, and the ring gear/sun gear tooth ratio of the planetary gearset 430. The planet carrier assembly member 426, the planet carrier assembly member 446, and the ring gear member 434 are rotated forwardly at a speed determined by the speed of the sun gear member 422 and the ring gear/sun gear tooth ratio of the planetary gearset 420. The ring gear member 444 and output shaft 19 are rotated in reverse by a speed determined by the speed of sun gear member 442, the speed of planet carrier assembly member 446, and the ring gear/sun gear tooth ratio of the planetary gearset 440. The overall numerical value of the reverse ratio is determined by the ring gear/sun gear tooth ratios of the planetary gearsets 420, 430, and 440.

The first forward speed ratio is established with the engagement of the torque-transmitting mechanisms 450 and 456. As noted in the truth table shown in FIG. 10, the torque-transmitting mechanism 450 can be maintained engaged through the neutral condition. During the first forward speed ratio, the sun gear member 432 and sun gear member 422 are driven forwardly at an increased speed determined by the speed of the planet carrier assembly member 436, the speed of ring gear member 434, and the ring gear/sun gear tooth ratio of the planetary gearset 430. The planet carrier assembly member 426, planet carrier assembly member 446, and ring gear member 434 are driven forwardly at a reduced speed determined by the speed of the sun gear member 422 and the ring gear/sun gear tooth ratio of the planetary gearset 420. The ring gear member 444 and the output shaft 19 are driven forwardly at a reduced speed determined by the speed of the sun gear member 442, the speed of the planet carrier assembly member 446, and the ring gear/sun gear tooth ratio of the planetary gearset 440. The overall numerical value of the first forward speed ratio is determined by the ring gear/sun gear tooth ratios of the planetary gearsets 420, 430, and 440.

The second forward speed ratio is established with the interchange of the torque-transmitting mechanisms 456 and 452. During the second forward speed ratio, the sun gear member 432 and sun gear member 422 are driven forwardly at a speed determined by the speed of the planet carrier assembly member 436 and the ring gear member 434, as well as the ring gear/sun gear tooth ratio of the planetary gearset 430. The planet carrier assembly member 426 and the output shaft 19 are driven forwardly at a speed determined by the speed of the sun gear member 422 and the ring gear/sun gear tooth ratio of the planetary gearset 420. The overall numerical value of the second forward speed ratio is determined by the ring gear/sun gear tooth ratios of the planetary gearsets 420 and 430.

The third forward speed ratio is established by the interchange of the torque-transmitting mechanisms 450 and 456. This is a single transition ratio interchange. With the engagement of the torque-transmitting mechanism 452, the planet carrier assembly member 446, and ring gear member 444 are interconnected and therefore the planetary gearset 440 rotates as a single unit. The sun gear member 442 is driven directly by the input shaft 17 through the torque-transmitting mechanism 456 and therefore the third forward speed ratio is a direct drive, or 1:1 ratio.

The fourth forward speed ratio is established by the interchange of the torque-transmitting mechanisms 456 and 458. This is a single transition ratio interchange. The ring gear member 434, and therefore output shaft 19, are driven forwardly at an increased speed determined by the speed of the planet carrier assembly member 436 and the ring gear/sun gear tooth ratio of the planetary gearset 430. The overall numerical value of the fourth forward speed ratio is determined by the ring gear/sun gear tooth ratio of the planetary gearset 430.

The fifth forward speed ratio is established by the interchange of the torque-transmitting mechanisms 452 and 456. During the fifth forward speed ratio, the planet carrier assembly member 436 and sun gear member 442 are driven by the input shaft 17, and the sun gear member 432 is held stationary. The ring gear member 434 is driven forwardly at an increased speed determined by the speed of the planet carrier assembly member 436 and the ring gear/sun gear tooth ratio of the planetary gearset 430. The ring gear member 444 and output shaft 19 are driven forwardly at an increased speed determined by the speed of the planet carrier assembly member 446, the speed of the sun gear member 442, and the ring gear/sun gear tooth ratio of the planetary gearset 440. The overall numerical value of the fifth forward speed ratio is determined by the ring gear/sun gear tooth ratios of the planetary gearsets 430 and 440.

The sixth forward speed ratio is established by the interchange of the torque-transmitting mechanisms 454 and 456. This is a single transition ratio interchange. During the sixth forward speed ratio, the sun gear member 432 and sun gear member 442 are held stationary. The ring gear member 434 and planet carrier assembly member 446 are driven forwardly at an increased speed determined by the speed the planet carrier assembly member 436 and the ring gear/sun gear tooth ratio of the planetary gearset 430. The ring gear member 444 and the output shaft 19 are driven forwardly at an increased speed determined by the speed of the planet carrier assembly member 446 and the ring gear/sun gear tooth ratio of the planetary gearset 440. The overall numerical value of the sixth forward speed ratio is determined by the ring gear/sun gear tooth ratios of the planetary gearsets 430 and 440.

As described above, the truth table of FIG. 10 shows that the single step interchanges in the forward direction are all of the single transition type. Also, it should be noted that the double step interchanges in the forward direction are of the single transition type interchange. The chart of FIG. 10 describes the ratio steps between adjacent forward speed ratios. For example, the step ratio between the first and second speed ratios is 1.91.

Figures 11, 12:
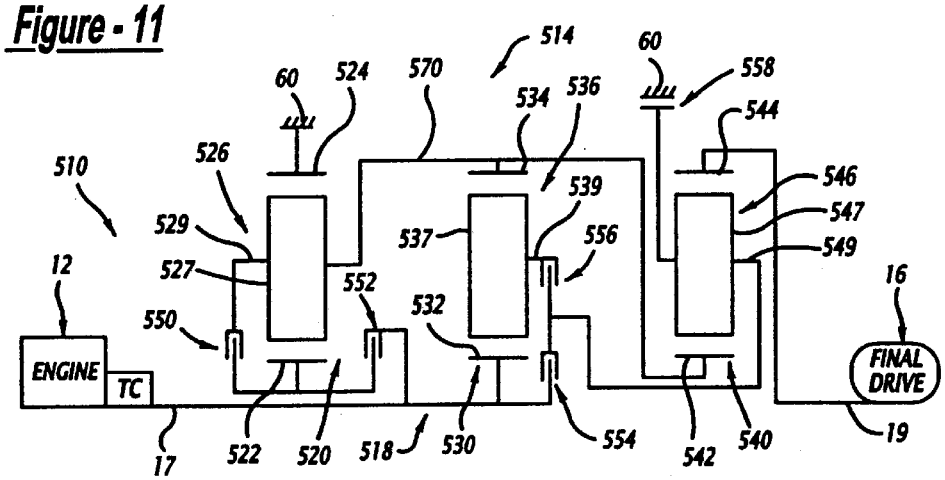
FIG. 11 is a schematic representation of a powertrain incorporating another planetary gear arrangement that is a member of the family of transmissions incorporating the present invention.
FIG. 12 is a truth table and chart describing some of the operating characteristics of the transmission depicted in FIG. 11.

A powertrain 510, shown in FIG. 11, includes the conventional engine and torque converter 12, a multi-speed planetary transmission 514, and the conventional final drive 16. The planetary transmission 514 includes the input shaft 17, a planetary gear arrangement 518, and the output shaft 19. The input shaft 17 is continuously connected with the engine and torque converter 12, and the output shaft 19 is continuously connected with the final drive mechanism 16. The planetary gear arrangement 518 includes three planetary gearsets 520, 530, and 540 and five torque-transmitting mechanisms 550, 552, 554, 556, and 558.

The planetary gearset 520 includes a sun gear member 522, a ring gear member 524, and a planet carrier assembly member 526 which includes a plurality of pinion gears 527 rotatably mounted on a carrier 529 and disposed in meshing relationship with the sun gear member 522 and the ring gear member 524.

The planetary gearset 530 includes a sun gear member 532, a ring gear member 534, and a planet carrier assembly member 536 which includes a plurality of pinion gears 537 rotatably mounted on a carrier 539 and disposed in meshing relationship with the sun gear member 532 and the ring gear member 534.

The planetary gearset 540 includes a sun gear member 542, a ring gear member 544, and a planet carrier assembly member 546 which includes a plurality of pinion gears 547 rotatably mounted on a planet carrier 549 and disposed in meshing relationship with the sun gear member 542 and the ring gear member 544.

The sun gear member 532 is continuously connected with the input shaft 17, and the ring gear member 544 is continuously connected with the output shaft 19. The ring gear member 524 is continuously connected with the transmission housing 60. The planet carrier assembly member 526, the ring gear member 534, and the sun gear member 542 are continuously interconnected by the interconnecting member 570. The interconnecting member 570 is selectively connectible with the sun gear member 522 through the torque-transmitting mechanism 550. The input shaft 17 is selectively connectible with the sun gear member 522 through the torque-transmitting mechanism 552, and with the planet carrier assembly member 546 through the torque-transmitting mechanism 554. The planet carrier assembly member 546 is also selectively connectible with the transmission housing 60 through the torque-transmitting mechanism 558, and with the planet carrier assembly member 536 through the torque-transmitting mechanism 556.

The truth table and chart, shown in FIG. 12, defines the torque-transmitting mechanism engagement sequence required for each of the forward speed ratios and the reverse speed ratio. The truth table also indicates that the torque-transmitting mechanism 558 can remain engaged through the neutral condition thereby simplifying the forward/reverse interchange. The numerical values for the ratios have been determined using the ring gear/sun gear tooth ratio relationships also defined in FIG. 12 by way of example. The chart of FIG. 12 defines the step ratios, that is, the multiple between the adjacent steps in the forward direction. For example, the first to second step ratio is 1.93. The truth table of FIG. 12 also shows that the single step ratios in the forward direction, that is, first to second, second to third, etc., are single transition ratio interchanges. It will also be evident from the truth table that the double step, that is first to third, second to fourth, etc., are also single transition ratio interchanges.

Those skilled in the art will recognize that the numerical value of the reverse speed ratio is determined by the planetary gearsets 520 and 540. The numerical value of the first forward speed ratio is determined by the planetary gearsets 530 and 540. The second forward speed ratio has a numerical value that is determined by the planetary gearsets 530 and 540 also. The third forward speed ratio has a numerical value that is determined by the planetary gearsets 520, 530, and 540. The fourth forward speed ratio is a direct drive ratio. The fifth forward speed ratio has a numerical value determined by the planetary gearsets 520 and 540. The sixth forward speed ratio has a numerical value determined by the planetary gearset 540.

Figures 13, 14:
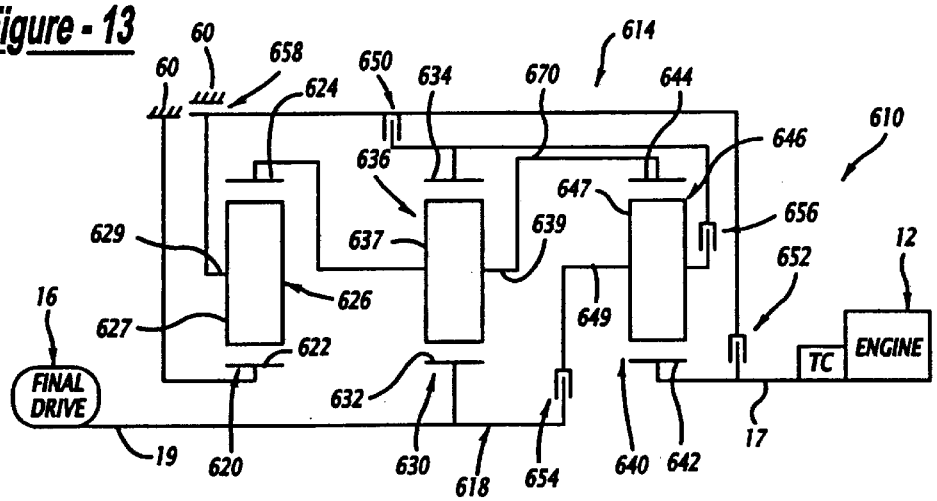
FIG. 13 is a schematic representation of a powertrain incorporating another planetary gear arrangement that is a member of the family of transmissions incorporating the present invention.
FIG. 14 is a truth table and chart describing some of the operating characteristics of the transmission depicted in FIG. 13.

A powertrain 610, shown in FIG. 13, includes the conventional engine and torque converter 12, a multi-speed planetary transmission 614, and the conventional final drive 16. The planetary transmission 614 includes the input shaft 17, a planetary gear arrangement 618, and the output shaft 19. The input shaft 17 is continuously connected with the engine and torque converter 12, and the output shaft 19 is continuously connected with the final drive mechanism 16. The planetary gear arrangement 618 includes three planetary gearsets 620, 630, and 640 and five torque-transmitting mechanisms 650, 652, 654, 656, and 658.

The planetary gearset 620 includes a sun gear member 622, a ring gear member 624, and a planet carrier assembly member 626 which includes a plurality of pinion gears 627 rotatably mounted on a carrier 629 and disposed in meshing relationship with the sun gear member 622 and the ring gear member 624.

The planetary gearset 630 includes a sun gear member 632, a ring gear member 634, and a planet carrier assembly member 636 which includes a plurality of pinion gears 637 rotatably mounted on a carrier 639 and disposed in meshing relationship with the sun gear member 632 and the ring gear member 634.

The planetary gearset 640 includes a sun gear member 642, a ring gear member 644, and a planet carrier assembly member 646 which includes a plurality of pinion gears 647 rotatably mounted on a planet carrier 649 and disposed in meshing relationship with the sun gear member 642 and the ring gear member 644.

The input shaft 17 is continuously connected with the sun gear member 642, and the output shaft 19 is continuously connected with the sun gear member 632. The sun gear member 622 is continuously connected with the transmission housing 60. The ring gear member 624, planet carrier assembly member 636, and ring gear member 644 are continuously interconnected by an interconnecting member 670. The input shaft 17 is selectively connectible with the planet carrier assembly member 626 through the torque-transmitting mechanism 652. The planet carrier assembly member 626 is also selectively connectible with the transmission housing 60 through the torque-transmitting mechanism 658, and with the ring gear member 634 through the torque-transmitting mechanism 650. The planet carrier assembly member 646 is selectively connectible with the output shaft 19 through the torque-transmitting mechanism 654, and with the ring gear member 634 through the torque-transmitting mechanism 656.

The truth table, shown in FIG. 14, defines the torque-transmitting mechanism engagement sequence required for each of the forward speed ratios and the reverse speed ratio. The truth table also indicates that the torque-transmitting mechanism 658 can remain engaged through the neutral condition thereby simplifying the forward/reverse interchange. The numerical values for the ratios have been determined utilizing the ring gear/sun gear tooth ratios given in FIG. 14. For example, the R1/S1 equaling 1.86 is the numerical value for the ring gear/sun gear tooth ratio of the planetary gearset 620. The R2/S2 value is for the ring gear/sun gear tooth ratio relationship of the planetary gearset 630. The R3/S3 is the numerical value for the ring gear/sun gear tooth ratio of the planetary gearset 640.

As can be determined from the truth table of FIG. 14, the single ratio interchanges for the forward speed ratios are single transition interchanges. Also, the double step interchanges, such as first to third, second to fourth, third to fifth, and fourth to sixth, are also single transition interchanges. The chart in FIG. 14 defines the step ratios between adjacent forward ratios and also the step ratio between reverse and the first forward speed ratio. For example, the step ratio between the first and second forward speed ratio is 1.67.

Those skilled in the art, upon reviewing the truth table of FIG. 14 will recognize that the reverse speed ratio is determined utilizing the ring gear/sun gear tooth ratios of the planetary gearsets 630 and 640. The numerical value for the first forward speed ratio is determined by the planetary gearset 640. The numerical value for the second forward speed ratio is determined by the planetary gearsets 620, 630, and 640. The numerical value of the third forward speed ratio is one or a direct drive. The numerical value of the fourth forward speed ratio is determined by the planetary gearsets 620 and 640. The numerical value for the fifth forward speed ratio is determined by the planetary gearsets 620, 630, and 640. The numerical value for the sixth forward speed ratio is determined by the planetary gearsets 620 and 630.

Figures 17, 18:
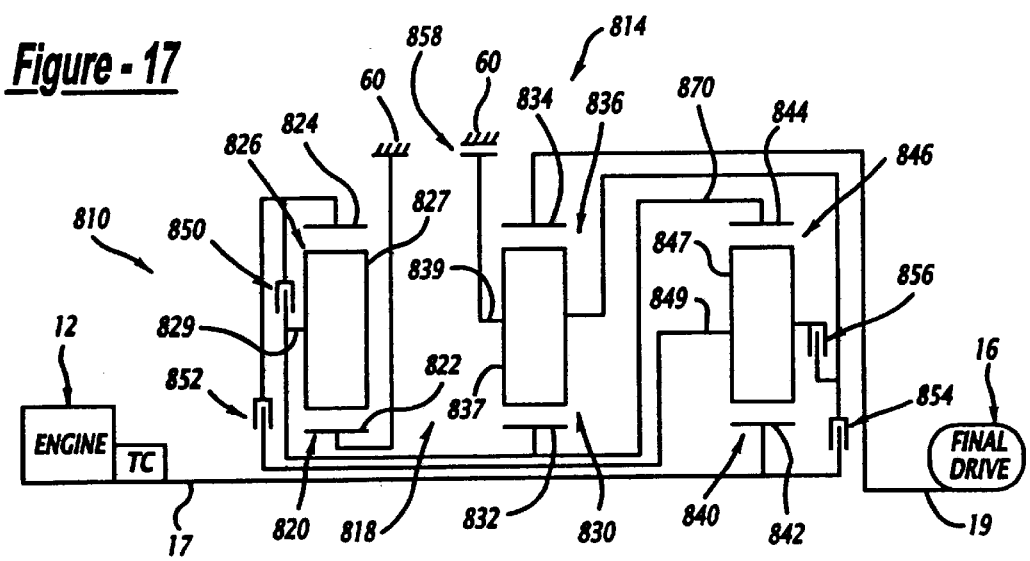
FIG. 17 is a schematic representation of a powertrain incorporating another planetary gear arrangement that is a member of the family of transmissions incorporating the present invention.
FIG. 18 is a truth table and chart describing some of the operating characteristics of the transmission depicted in FIG. 17.

A powertrain 710, shown in FIG. 17, includes the conventional engine and torque converter 12, a multi-speed planetary transmission 714, and the conventional final drive 16. The engine and torque converter 12 are drivingly connected with the planetary transmission 714 through the input shaft 17. The planetary transmission 714 is drivingly connected with the final drive 16 through the output shaft 19. The planetary transmission 714 includes a planetary gear arrangement 718 that includes a first planetary gearset 720, a second planetary gearset 730, and third planetary gearset 740.

The planetary transmission 714 also includes five torque-transmitting mechanisms 750, 752, 754, 756, and 758 that are conventional selectively engageable fluid-operated devices. The torque-transmitting mechanisms 750, 752, 754, and 756 are rotating type torque-transmitting mechanisms, commonly termed clutches. The torque-transmitting mechanism 758 is a stationary torque-transmitting mechanism, commonly termed a brake. The torque-transmitting mechanism 758 is connected to a stationary component of transmission 714, such as the transmission housing 60.

The planetary gearset 720 includes a sun gear member 722, a ring gear member 724, and a planet carrier assembly member 726 which includes a plurality of pinion gears 727 rotatably mounted on a carrier 729 and disposed in meshing relationship with the sun gear member 722 and the ring gear member 724.

The planetary gearset 730 includes a sun gear member 732, a ring gear member 734, and a planet carrier assembly member 736 which includes a plurality of pinion gears 737 rotatably mounted on a carrier 739 and disposed in meshing relationship with the sun gear member 732 and the ring gear member 734.

The planetary gearset 740 includes a sun gear member 742, a ring gear member 744, and a planet carrier assembly member 746 which includes a plurality of pinion gears 747 rotatably mounted on a planet carrier 749 and disposed in meshing relationship with the sun gear member 742 and the ring gear member 744.

The sun gear member 742 is continuously connected with the input shaft 17, and the planet carrier assembly member 746 is continuously connected with the output shaft 19. The sun gear member 722 is continuously connected with the transmission housing 60. The planet carrier assembly member 726, the ring gear member 734, and the ring gear member 744 are continuously interconnected by an interconnecting member 770. The planet carrier assembly member 736 is selectively connectible with the ring gear member 724 through the torque-transmitting mechanism 750, with the input shaft 17 through the torque-transmitting mechanism 752, and with the transmission housing 60 through the torque-transmitting mechanism 758. The sun gear member 732 is selectively connectible with the planet carrier assembly member 746 and output shaft 19 through the torque-transmitting mechanism 756, and is selectively connectible with the input shaft 17 through the torque-transmitting mechanism 754.

Figures 15, 16:
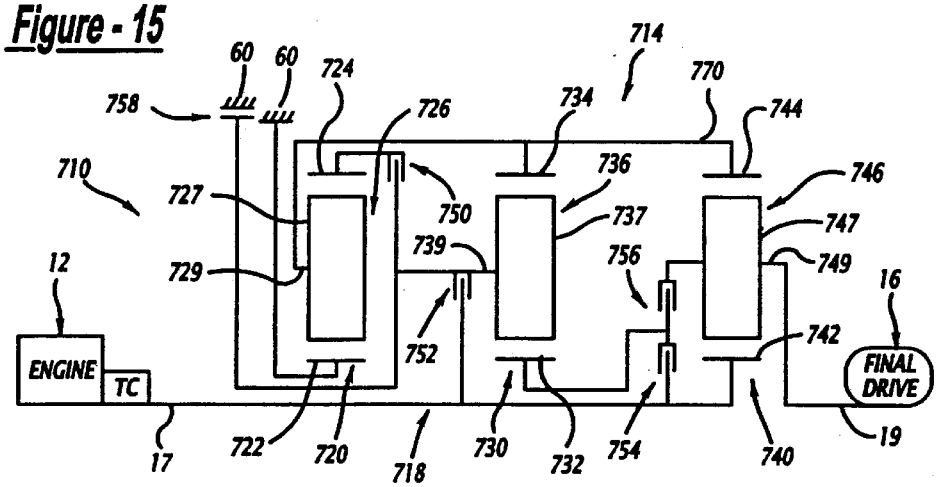
FIG. 15 is a schematic representation of a powertrain incorporating another planetary gear arrangement that is a member of the family of transmissions incorporating the present invention.
FIG. 16 is a truth table and chart describing some of the operating characteristics of the transmission depicted in FIG. 15.

The truth table and chart, shown in FIG. 16 define the torque-transmitting mechanism engagement sequence required for each of the six forward speed ratios and the reverse speed ratio. The truth table also indicates that the torque-transmitting mechanism 758 can remain engaged through the neutral condition thereby simplifying the forward/reverse interchange. The numerical values for the ratios of each of the speeds has been determined utilizing the ring gear/sun gear tooth ratios given in FIG. 16. The R1/S1 value is the ring gear/sun gear tooth ratio of the planetary gearset 720; the R2/S2 value is the ring gear/sun gear tooth ratio of the planetary gearset 730; and the R3/S3 value is the ring gear/sun gear tooth ratio of the planetary gearset 740.

As can be determined from the truth table, the single step ratio interchanges in the forward direction are single transition interchanges. Also, the double step ratio interchanges, such as first to third, second to fourth, third to fifth, and fourth to sixth, are single transition interchanges. FIG. 16 also describes the step ratio between adjacent ratios, for example, the numerical ratio between first and second is 1.49.

Those skilled in the art will recognize that the numerical value of the reverse speed ratio is determined by the planetary gearsets 730 and 740. The numerical value of the first forward speed ratio is determined by the planetary gearsets 730 and 740. The numerical value of the second forward speed ratio is determined by the planetary gearset 740. The numerical value of the third forward speed ratio is determined by the planetary gearsets 720, 730, and 740. The numerical value of the fourth forward speed ratio is determined by the planetary gearsets 720, 730, and 740. The numerical value of the fifth forward speed ratio is determined by the planetary gearsets 720 and 740. The numerical value of the sixth forward speed ratio is one, that is, the sixth forward speed ratio is a direct drive.

A powertrain 810, shown in FIG. 17, includes the conventional engine and torque converter 12, a multi-speed planetary transmission 814, and the conventional final drive 16. The engine and torque converter 12 are drivingly connected with the planetary transmission 814 through the input shaft 17. The planetary transmission 814 is drivingly connected with the final drive 16 through the output shaft 19. The planetary transmission 814 includes a planetary gear arrangement 818 that includes a first planetary gearset 820, a second planetary gearset 830, and third planetary gearset 840.

The planetary transmission 814 also includes five torque-transmitting mechanisms 850, 852, 854, 856, and 858 which are conventional selectively engageable fluid-operated devices. The torque-transmitting mechanisms 850, 852, 854, and 856 are rotating type torque-transmitting mechanisms, commonly termed clutches. The torque-transmitting mechanism 858 is a stationary torque-transmitting mechanism, commonly termed a brake. The torque-transmitting mechanism 858 is connected to a stationary component of transmission 814, such as the transmission housing 60.

The planetary gearset 820 includes a sun gear member 822, a ring gear member 824, and a planet carrier assembly member 826 which includes a plurality of pinion gears 827 rotatably mounted on a carrier 829 and disposed in meshing relationship with the sun gear member 822 and the ring gear member 824.

The planetary gearset 830 includes a sun gear member 832, a ring gear member 834, and a planet carrier assembly member 836 which includes a plurality of pinion gears 837 rotatably mounted on a carrier 839 and disposed in meshing relationship with the sun gear member 832 and the ring gear member 834.

The planetary gearset 840 includes a sun gear member 842, a ring gear member 844, and a planet carrier assembly member 846 which includes a plurality of pinion gears 847 rotatably mounted on a planet carrier 849 and disposed in meshing relationship with the sun gear member 842 and the ring gear member 844.

The sun gear member 842 is continuously connected with the input shaft 17, and the ring gear member 834 is continuously connected with the output shaft 19. The sun gear member 822 is continuously connected with the transmission housing 60. The planet carrier assembly member 826, sun gear member 832, and ring gear member 844 are continuously interconnected by an interconnecting member 870. The ring gear member 824 is selectively connectible with the planet carrier assembly member 826, and therefore the interconnecting member 870, through the torque-transmitting mechanism 850, and is selectively connectible with the planet carrier assembly member 846 through the torque-transmitting mechanism 852. The planet carrier assembly member 836 is selectively connectible with the transmission housing 60 through the torque-transmitting mechanism 858, with the planet carrier assembly member 846 through the torque-transmitting mechanism 856, and with input shaft 17 through the torque-transmitting mechanism 854.

The truth table described in FIG. 18 defines the torque-transmitting mechanism engagement sequence required to establish the reverse drive ratio and the six forward speed ratios. The truth table also indicates that the torque-transmitting mechanism 858 can remain engaged through the neutral condition thereby simplifying the forward/reverse ratio interchange.

As described for family members above, the ratios shown in the truth table of FIG. 18 are established utilizing the ring gear/sun gear tooth ratios, also defined as examples in FIG. 18. The truth table also indicates that all of the single step forward ratio interchanges are single transition interchanges. The double step ratio interchanges are also single transition interchanges. Further, FIG. 18 describes the ratio steps between adjacent forward speed ratios and between the reverse/forward ratio. For example, the first to second step ratio is 1.92.

Those skilled in the art will recognize that the numerical value of the reverse speed ratio is determined utilizing the ring gear/sun gear tooth ratios of the planetary gearsets 820, 830, and 840. The numerical value of the first forward speed ratio is determined utilizing the ring gear/sun gear tooth ratios of the planetary gearsets 830 and 840. The numerical value of the second forward speed ratio is determined utilizing the planetary gearsets 830 and 840. The numerical value of the third forward speed ratio is determined utilizing the planetary gearsets 820, 830, and 840. The fourth forward speed ratio is a direct drive ratio, or a 1:1 ratio. The numerical value of the fifth forward speed ratio is determined by the planetary gearsets 820, 830, and 840. The numerical value of the sixth forward speed ratio is determined by the planetary gearset 830.

A powertrain 910, shown in FIG. 19, includes the conventional engine and torque converter 12, a multi-speed planetary transmission 914, and the conventional final drive 16. The engine and torque converter 12 are drivingly connected with the planetary transmission 914 through the input shaft 17. The planetary transmission 914 is drivingly connected with the final drive 16 through the output shaft 19. The planetary transmission 914 includes a planetary gear arrangement 918 that includes a first planetary gearset 920, a second planetary gearset 930, and third planetary gearset 940.

The planetary transmission 914 also includes five torque-transmitting mechanisms 950, 952, 954, 956, and 958 which are conventional selectively engageable fluid-operated devices. The torque-transmitting mechanisms 950, 952, 954, 956 and 958 are rotating type torque-transmitting mechanisms, commonly termed clutches The torque-transmitting mechanism 958 can remain engaged through the neutral condition during a forward/reverse interchange.

The planetary gearset 920 includes a sun gear member 922, a ring gear member 924, and a planet carrier assembly member 926 which includes a plurality of pinion gears 927 rotatably mounted on a carrier 929 and disposed in meshing relationship with the sun gear member 922 and the ring gear member 924.

The planetary gearset 930 includes a sun gear member 932, a ring gear member 934, and a planet carrier assembly member 936 which includes a plurality of pinion gears 937 rotatably mounted on a carrier 939 and disposed in meshing relationship with the sun gear member 932 and the ring gear member 934.

The planetary gearset 940 includes a sun gear member 942, a ring gear member 944, and a planet carrier assembly member 946 which includes a plurality of pinion gears 947 rotatably mounted on a planet carrier 949 and disposed in meshing relationship with the sun gear member 942 and the ring gear member 944.

The ring gear member 944 is continuously connected with the input shaft 17, the planet carrier assembly member 936 is continuously connected with the output shaft 19, and the sun gear member 922 is continuously connected with the transmission housing 60. The planet carrier assembly member 926, the ring gear member 934, and the planet carrier assembly member 946 are continuously interconnected by an interconnecting member 970. The ring gear member 924 is selectively connectible with the planet carrier assembly member 926 through the torque-transmitting mechanism 950, selectively connectible with the planet carrier assembly member 936 through the torque-transmitting mechanism 952, and selectively connectible with the sun gear member 942 through the torque-transmitting mechanism 954. The sun gear member 932 is selectively connectible with the sun gear member 942 through the torque-transmitting mechanism 958, and with the ring gear member 944 and therefore input shaft 17 through the torque-transmitting mechanism 956.

The truth table of FIG. 20 defines the torque-transmitting mechanism engagement schedule utilized for each of the forward speed ratios and the reverse speed ratio. As indicated in the truth table of FIG. 20, all of the single step forward interchanges are single transition ratio interchanges. It should also be noted that the double step interchanges in the forward direction are single transition ratio interchanges.

The examples of ratios defined in FIG. 20 are determined utilizing the ring gear/sun gear tooth ratios given by way of example in FIG. 20. Also, as noted in FIG. 20, the ratio steps from reverse to first as well as the ratio steps between adjacent forward speed ratios is given. For example, the ratio step from first to second ratio is 1.58. Those skilled in the art will recognize that the numerical value of the reverse ratio is determined by the planetary gearsets 930 and 940. The numerical value of the first forward speed ratio is determined by the planetary gearset 930. The numerical value of the second forward speed ratio is determined by the planetary gearsets 920 and 930. The numerical value of the third forward speed ratio is one, that is, third is a direct drive. The numerical value of the fourth and fifth speed ratios are both determined by utilizing all three planetary gearsets 920, 930, and 940. The numerical value of the sixth forward speed ratio is determined by the planetary gearsets 920 and 940.

Figures 21, 22:
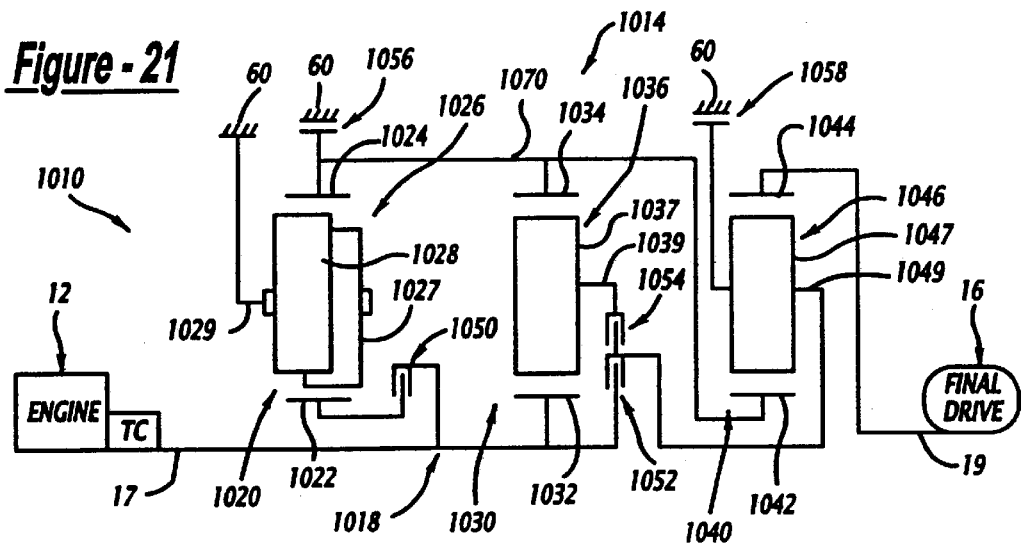
FIG. 21 is a schematic representation of a powertrain incorporating another planetary gear arrangement that is a member of the family of transmissions incorporating the present invention.
FIG. 22 is a truth table and chart describing some of the operating characteristics of the transmission depicted in FIG. 21.

A powertrain 1010, shown in FIG. 21, includes the conventional engine and torque converter 12, a multi-speed planetary transmission 1014, and the conventional final drive 16. The engine and torque converter 12 are drivingly connected with the planetary transmission 1014 through the input shaft 17. The planetary transmission 1014 is drivingly connected with the final drive 16 through the output shaft 19. The planetary transmission 1014 includes a planetary gear arrangement 1018 that includes a first planetary gearset 1020, a second planetary gearset 1030, and third planetary gearset 1040.

The planetary transmission 1014 also includes five torque-transmitting mechanisms 1050, 1052, 1054, 1056, and 1058 which are conventional selectively engageable fluid-operated devices. The torque-transmitting mechanisms 1050, 1052, and 1054, are rotating type torque-transmitting mechanisms, commonly termed clutches. The torque-transmitting mechanisms 1056 and 1058 are stationary torque-transmitting mechanisms, commonly termed a brake. The torque-transmitting mechanisms 1056 and 1058 are connected to a stationary component of transmission 1014, such as the transmission housing 60.

The planetary gearset 1020 includes a sun gear member 1022, a ring gear member 1024, and a planet carrier assembly member 1026. The planet carrier assembly member 1026 includes a pair of intermeshing pinion gears 1027 and 1028 that are rotatably mounted on a planet carrier 1029 and meshing with the sun gear member 1022 and the ring gear member 1024, respectively.

The planetary gearset 1030 includes a sun gear member 1032, a ring gear member 1034, and a planet carrier assembly member 1036 which includes a plurality of pinion gears 1037 rotatably mounted on a carrier 1039 and disposed in meshing relationship with the sun gear member 1032 and the ring gear member 1034.

The planetary gearset 1040 includes a sun gear member 1042, a ring gear member 1044, and a planet carrier assembly member 1046 which includes a plurality of pinion gears 1047 rotatably mounted on a planet carrier 1049 and disposed in meshing relationship with the sun gear member 1042 and the ring gear member 1044.

The sun gear member 1032 is continuously connected with the input shaft 17, the ring gear member 1044 is continuously connected with the output shaft 19, and the planet carrier assembly member 1026 is continuously connected with the transmission housing 60. The ring gear member 1024, ring gear member 1034, and sun gear member 1042 are continuously connected with an interconnecting member 1070 which is selectively connectible with the transmission housing 60 through a torque-transmitting mechanism 1056. The planet carrier assembly member 1046 is selectively connectible with the transmission housing 60 through the torque-transmitting mechanism 1058, with the sun gear member 1032 through the torque-transmitting mechanism 1052, and with the planet carrier assembly member 1036 through the torque-transmitting mechanism 1054. The sun gear member 1022 is selectively connectible with the input shaft 17 through the torque-transmitting mechanism 1050.

The truth table shown in FIG. 22 defines the torque-transmitting mechanism engagement sequence utilized for each of the forward speed ratios and the reverse speed ratio. The truth table also indicates that the torque-transmitting mechanism 1058 can remain engaged through the forward/reverse interchange thereby simplifying the this interchange. The examples of numerical ratios given in the truth table have been derived utilizing the ring gear/sun gear tooth ratios given in FIG. 22. Also, the truth table of FIG. 22 defines the single steps between the forward speed ratios as being single transition interchanges. The double step interchanges are also single transition interchanges. The chart of FIG. 22 defines the ratio steps between adjacent forward ratios and the ratio step between the reverse and first forward speed ratio. For example, the step ratio between the first and second forward speed ratios is 2.06.

Those skilled in the art will recognize that the numerical value of the reverse speed ratio is determined by the planetary gearsets 1020 and 1040. The numerical value of the first and second forward speed ratios is determined by the planetary gearsets 1030 and 1040. The numerical value of the third forward speed ratio is determined by the planetary gearsets 1020, 1030, and 1040. The fourth forward speed ratio is a 1:1 drive ratio. The numerical value of the fifth forward speed ratio is determined by the planetary gearsets 1020 and 1040. The numerical value of the sixth forward speed ratio is determined by the planetary gearset 1040.

Figures 23, 24:
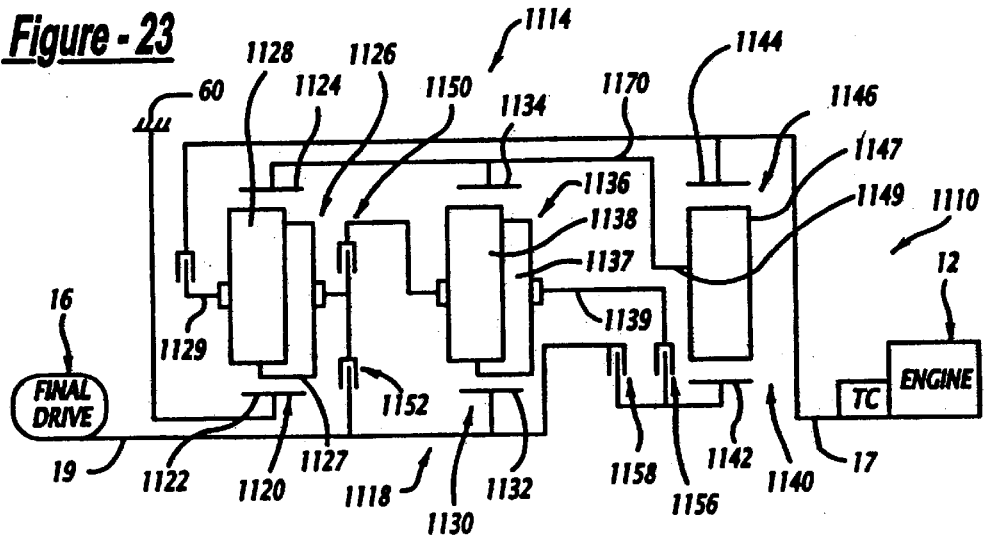
FIG. 23 is a schematic representation of a powertrain incorporating another planetary gear arrangement that is a member of the family of transmissions incorporating the present invention.
FIG. 24 is a truth table and chart describing some of the operating characteristics of the transmission depicted in FIG. 23.

A powertrain 1110, shown in FIG. 23, includes the conventional engine and torque converter 12, a multi-speed planetary transmission 1114, and the conventional final drive 16. The engine and torque converter 12 are drivingly connected with the planetary transmission 1114 through the input shaft 17. The planetary transmission 1114 is drivingly connected with the final drive 16 through the output shaft 19. The planetary transmission 1114 includes a planetary gear arrangement 1118 that includes a first planetary gearset 1120, a second planetary gearset 1130, and third planetary gearset 1140.

The planetary transmission 1114 also includes five torque-transmitting mechanisms 1150, 1152, 1154, 1156, and 1158 which are conventional selectively engageable fluid-operated devices. The torque-transmitting mechanisms 1150, 1152, 1154, 1156 and 1158 are rotating type torque-transmitting mechanisms, commonly termed clutches. The torque-transmitting mechanism 1154 can remain engaged through the neutral condition during a forward/reverse interchange to simplify the control mechanism.

The planetary gearset 1120 includes a sun gear member 1122, a ring gear member 1124, and a planet carrier assembly member 1126. The planet carrier assembly member 1126 includes a pair of intermeshing pinion gears 1127 and 1128 that are rotatably mounted on a planet carrier 1129 and meshing with the sun gear member 1122 and the ring gear member 1124, respectively.

The planetary gearset 1130 includes a sun gear member 1132, a ring gear member 1134, and a planet carrier assembly member 1136. The planet carrier assembly member 1136 includes a pair of intermeshing pinion gears 1137 and 1138 which are rotatably mounted on a planet carrier 1139 and disposed in meshing relationship with the sun gear member 1132 and the ring gear member 1134, respectively.

The planetary gearset 1140 includes a sun gear member 1142, a ring gear member 1144, and a planet carrier assembly member 1146 which includes a plurality of pinion gears 1147 rotatably mounted on a planet carrier 1149 and disposed in meshing relationship with the sun gear member 1142 and the ring gear member 1144.

The ring gear member 1144 is continuously connected with the input shaft 17, the sun gear member 1132 is continuously connected with output shaft 19, and the sun gear member 1122 is continuously connected with the transmission housing 60. The ring gear member 1124, ring gear member 1134, and planet carrier assembly member 1146 are continuously interconnected through an interconnecting member 1170. The input shaft 17 is selectively connectible with the planet carrier assembly member 1126 through the torque-transmitting mechanism 1154. The output shaft 19 is selectively connectible with the planet carrier assembly member 1126 through the torque-transmitting mechanism 1152, and with the sun gear member 1142 through the torque-transmitting mechanism 1158. The planet carrier assembly member 1136 is selectively connectible with the planet carrier assembly member 1126 through the torque-transmitting mechanism 1150, and with the sun gear member 1142 through the torque-transmitting mechanism 1156.

The truth table defined in FIG. 24 illustrates the torque-transmitting engagement sequence required for each of the forward speed ratios and the reverse speed ratio. The truth table also indicates that the torque-transmitting mechanism 1154 can remain engaged through the neutral condition. As seen in the truth table of FIG. 24, each of the single step forward ratio interchanges is a single transition ratio interchange, as well as each of the double step forward interchange are single transition interchanges.

Those skilled in the art will recognize that the numerical value of the reverse speed ratio is determined by the planetary gearsets 1120 and 1140. The numerical value of the first forward speed ratios is determined by the planetary gearsets 1120 and 1130. The numerical value of the second and third forward speed ratio is determined by the planetary gearsets 1120, 1130, and 1140. The fourth forward speed ratio is a 1:1 drive ratio. The numerical value of the fifth and sixth forward speed ratios are determined by all three of the planetary gearsets 1120, 1130, and 1140.

From the foregoing presentation it should be obvious that at least two of the planetary gearset has at least one member that is non-continuously interconnected with another member of the transmission. In most of the family members each of the planetary gearsets has at least one non-continuously interconnected member. The torque transmitting mechanisms are effective to provide a selective interconnection for those non-continuously interconnected members to establish a connection between them and other members of the transmission or between continuously interconnected members of the transmission such as the input shaft 17, the output shaft 19, or the interconnecting members.

What is claimed is:

1. A family of transmissions having a plurality of family embers wherein each family member comprises:

an input shaft;

an output shaft;

a transmission housing;

a first planetary gearset having first, second, and third members, each member comprised of a sun gear member, a ring gear member or a planet carrier assembly member;

a second planetary gearset having first, second, and third members, each member comprised of a sun gear member, a ring gear member or a planet carrier assembly member;

a third planetary gearset having first, second, and third members, each member comprised of a sun gear member, a ring gear member or a planet carrier assembly member;

an interconnecting member continuously interconnecting said first members of said planetary gearsets;

said second member of said first planetary gearset being continuously interconnected with said transmission housing;

said input shaft being continuously interconnected with a member of one of said planetary gearsets;

said output shaft being continuously interconnected with another member of one of said planetary gearsets;

a first torque transmitting mechanism selectively interconnecting a member of said first planetary gearset with either said input shaft, said output shaft, said interconnecting member, or a member of said second or third planetary gearset;

a second torque transmitting mechanism selectively interconnecting a member of said second planetary gearset with either said input shaft, said output shaft, said interconnecting member, or a member of said first or third planetary gearset;

a third torque transmitting mechanism selectively interconnecting a member of said third planetary gearset with either said input shaft, said output shaft, said interconnecting member, or a member of said first or second planetary gearset;

a fourth torque transmitting mechanism selectively interconnecting a member of one of said planetary gearsets with said interconnecting member or another member of said one of said planetary gearsets; or selectively interconnecting said transmission housing with a member of said second or third planetary gearset;

a fifth torque transmitting mechanism selectively interconnecting a member of one of said planetary gearsets with said input shaft, said output shaft, or another member of one of said planetary gearsets; or selectively interconnecting said transmission housing with a member of one of said planetary gearsets; and said five torque transmitting mechanisms being operable in combinations of two to establish at least six forward speed ratios and one reverse ratio between said input shaft and said output shaft.

2. The family of transmissions defined in claim 1 further wherein:
   each of said planet carrier assembly members has a plurality of pinion gear members rotatably disposed on a carrier and meshing with both said sun gear member and said ring gear member.

3. The family of transmissions defined in claim 1 further wherein:
   at least one of said planet carrier assembly members has a plurality of intermeshing pinion gears rotatably disposed on a carrier and meshing with respective ones of said sun gear member and said ring gear member.

4. A family of transmissions having a plurality of family members comprising:
   an input shaft;
   an output shaft;
   a stationary housing member;
   first, second, and third planetary gearsets each having a first member, a second member, and a third member;
   an interconnecting member continuously interconnecting said first members of each of said planetary gearsets;
   said second member of said first planetary gearset being continuously interconnected with said housing member;
   said input shaft being continuously interconnected with said second member of either said second or third planetary gearset;
   said output shaft being continuously interconnected with either said second member or said third member of said second or third planetary gearset;
   at least two of said planetary gearsets having at least one non-continuously interconnected member;
   five torque transmitting mechanisms independently operable to selectively interconnect said input shaft or said output shaft with at least one non-continuously interconnected member of said first or second planetary gearset, or selectively interconnect one of said non-continuously interconnected members with another member of one of said planetary gearsets or to a stationary transmission housing; and
   said torque transmitting mechanisms being operable in combinations of two to establish at least six forward speed ratios and one reverse ratio between said input shaft and said output shaft.

5. The family of transmissions defined in claim 4 further comprising:
   a first of said torque transmitting mechanisms being selectively operable to interconnect said third member of said second planetary gearset with said third member of said third planetary gearset, or being selectively operable to interconnect said third member of said first planetary gearset with said third member of said second planetary gearset.

6. The family of transmissions defined in claim 4 further comprising:
   a second of said torque transmitting mechanisms being selectively operable to interconnect said input shaft with said third member of one of said planetary gearsets, or being selectively operable to interconnect said output shaft with said third member of said first planetary gearset.

7. The family of transmissions defined in claim 4 further comprising:
   a third of said torque transmitting mechanisms being selectively operable to interconnect said input shaft with either said third member of one of said planetary gearsets or the second member of said second planetary gearset, or being selectively operable to interconnect said output shaft with said third member of said third planetary gearset, or being selectively operable to interconnect said third member of said third planetary gearset with the third member of either the first or second planetary gearset.

8. The family of transmissions defined in claim 4 further comprising:
   a fourth of said torque transmitting mechanisms being selectively operable to interconnect said transmission housing with either said interconnecting member or said third member of said first planetary gearset, or being selectively operable to interconnect said output shaft with either said interconnecting member, said second member of said second planetary gearset, or said third member of said third planetary gearset, or being selectively operable to interconnect said interconnecting member with said third member of said first planetary gearset.

9. The family of transmissions defined in claim 4 further comprising:
   a fifth of said torque transmitting mechanisms being selectively operable to interconnect said transmission housing with said third member of either said first, second, or third planetary gearset, or being selectively operable to interconnect said interconnecting member with said third member of said first planetary gearset, or being selectively operable to interconnect said third members of said second and third planetary gearsets.

10. The family of transmissions defined in claim 4 further comprising:
    a first of said torque transmitting mechanisms being operable to selectively interconnect two of said non-continuously connected members.

11. The family of transmissions defined in claim 10 further comprising:
    a second of said torque transmitting mechanisms being operable to selectively interconnect one of said input shaft and said output shaft with one of said non-continuously connected members.

12. The family of transmissions defined in claim 11 further comprising:
    a third of said torque transmitting mechanisms being operable to selectively interconnect one of said non-continuously connected members with one of said input shaft, said output shaft, and another of said non-continuously connected members.

13. The family of transmissions defined in claim 12 further comprising:
    a fourth of said torque transmitting mechanisms being operable to selectively interconnect one of said non-continuously connected members with one of said transmission housing, said output shaft, and said interconnecting member.

14. The family of transmissions defined in claim 13 further comprising:
    a fifth of said torque transmitting mechanisms being operable to selectively interconnect one of said non-continuously connected members with one of said transmission housing, said interconnecting member, and another of said non-continuously connected members.

* * * * *